(12) United States Patent
Choi et al.

(10) Patent No.: US 8,298,450 B2
(45) Date of Patent: *Oct. 30, 2012

(54) POLYBENZIMIDAZOLE-BASE COMPLEX, CROSSLINKED MATERIAL OF POLYBENZOXAZINES FORMED THEREOF, AND FUEL CELL USING THE SAME

(75) Inventors: Seongwoo Choi, Yongin-si (KR); Woosung Jeon, Suwon-si (KR); Insun Jung, Suwon-si (KR); Wonmok Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 964 days.

This patent is subject to a terminal disclaimer.

(21) Appl. No.: 12/247,338

(22) Filed: Oct. 8, 2008

(65) Prior Publication Data

US 2009/0098437 A1 Apr. 16, 2009

(30) Foreign Application Priority Data

Oct. 11, 2007 (KR) .................. 10-2007-0102579

(51) Int. Cl.
*H01B 1/12* (2006.01)
*H01M 8/06* (2006.01)

(52) U.S. Cl. .......... 252/519.34; 252/519.33; 252/519.2; 429/410; 429/500; 525/435

(58) Field of Classification Search ............. 252/519.33, 252/519.34, 519.2; 429/410, 500; 525/435
See application file for complete search history.

(56) References Cited

U.S. PATENT DOCUMENTS

| | | | |
|---|---|---|---|
| 4,828,699 A * | 5/1989 | Soehngen ................ 210/500.28 |
| 5,098,985 A | 3/1992 | Harris et al. |
| 5,250,633 A * | 10/1993 | Calundann et al. ........... 525/420 |
| 5,410,012 A | 4/1995 | Connell et al. |
| 5,525,436 A | 6/1996 | Savinell et al. |
| 5,637,670 A | 6/1997 | Connell et al. |
| 5,945,233 A | 8/1999 | Onorato et al. |
| 6,042,968 A | 3/2000 | Onorato et al. |
| 6,482,946 B1 | 11/2002 | Dettloff et al. |
| 6,620,905 B1 | 9/2003 | Musa |
| 6,855,674 B2 | 2/2005 | Gutierrez |
| 7,094,490 B2 * | 8/2006 | Cao et al. ................ 429/493 |
| 7,157,509 B2 | 1/2007 | Li et al. |
| 7,371,480 B2 | 5/2008 | Ono et al. |
| 7,388,035 B2 | 6/2008 | Kim et al. |
| 7,405,021 B2 | 7/2008 | Gascoyne et al. |
| 7,510,678 B2 | 3/2009 | Kim et al. |
| 7,619,044 B2 * | 11/2009 | Lee et al. .................. 525/477 |
| 7,649,025 B2 * | 1/2010 | Kitamura et al. ........... 521/27 |
| 7,709,579 B2 | 5/2010 | Lehmann et al. |
| 2001/0041283 A1 | 11/2001 | Hitomi |
| 2002/0127474 A1 | 9/2002 | Fleischer et al. |
| 2002/0164516 A1 | 11/2002 | Hasegawa et al. |
| 2003/0190516 A1 | 10/2003 | Tanno |
| 2004/0005493 A1 | 1/2004 | Tanno |
| 2004/0028976 A1 | 2/2004 | Cabasso et al. |
| 2004/0206953 A1 | 10/2004 | Morena et al. |
| 2004/0231143 A1 | 11/2004 | Visco et al. |
| 2004/0241522 A1 | 12/2004 | Ono et al. |
| 2004/0261660 A1 | 12/2004 | Li et al. |
| 2005/0074651 A1 | 4/2005 | Kidai et al. |
| 2005/0084728 A1 | 4/2005 | Kim et al. |
| 2005/0089744 A1 | 4/2005 | Kim et al. |
| 2005/0130006 A1 | 6/2005 | Hoshi et al. |
| 2005/0142413 A1 | 6/2005 | Kimura et al. |
| 2005/0247908 A1 | 11/2005 | Keller et al. |
| 2006/0078774 A1 | 4/2006 | Uensal et al. |
| 2006/0241192 A1 * | 10/2006 | Kitamura et al. ............... 521/27 |
| 2007/0020507 A1 | 1/2007 | Kim et al. |
| 2007/0141426 A1 * | 6/2007 | Choi et al. ................ 429/33 |
| 2007/0184323 A1 | 8/2007 | Lee et al. |
| 2007/0200994 A1 | 8/2007 | Yanagisawa |
| 2007/0238723 A1 | 10/2007 | Goble et al. |
| 2007/0275285 A1 | 11/2007 | Choi et al. |
| 2008/0020264 A1 | 1/2008 | Sun et al. |
| 2008/0045688 A1 | 2/2008 | Lin et al. |
| 2008/0050633 A1 * | 2/2008 | Kwon et al. ................ 429/33 |
| 2008/0118817 A1 | 5/2008 | Lee et al. |
| 2008/0145743 A1 | 6/2008 | Choi et al. |
| 2008/0157422 A1 * | 7/2008 | Lee et al. ................ 264/165 |
| 2009/0075147 A1 | 3/2009 | Kitamura et al. |
| 2009/0117436 A1 * | 5/2009 | Choi et al. ................ 429/33 |

(Continued)

FOREIGN PATENT DOCUMENTS

CN 101220153 7/2008

(Continued)

OTHER PUBLICATIONS

U.S. Appl. No. 11/514,254, filed Sep. 1, 2006, Seong-woo Choi et al., Samsung Electronics Co., Ltd.
U.S. Appl. No. 11/514,831, filed Sep. 5, 2006, Myung-jin Lee et al., Samsung Electronics Co., Ltd.
U.S. Appl. No. 11/743,778, filed May 3, 2007, Seong-woo Choi et al., Samsung Electronics Co., Ltd.
U.S. Appl. No. 11/856,350, filed Sep. 17, 2007, Seong-woo Choi et al., Samsung Electronics Co., Ltd.
U.S. Appl. No. 12/208,664, filed Sep. 11, 2008, Seong-woo Choi et al., Samsung Electronics Co., Ltd.

(Continued)

*Primary Examiner* — Douglas McGinty
(74) *Attorney, Agent, or Firm* — Stein McEwen, LLP

(57) ABSTRACT

A polybenzimidazole-base complex includes a polybenzimidazole-based material and a base, wherein a peak corresponding to NH of an imidazole ring of the polybenzimidazole-based material does not appear at a chemical shift of 12 to 15 ppm in a $^1$H nuclear magnetic resonance ($^1$H-NMR) spectrum of the polybenzimidazole-base complex. A crosslinked material may be formed as a polymerization product of a polybenzimidazole-base complex and a benzoxazine-based monomer. The crosslinked material may be used an electrolyte membrane for a fuel cell comprising the crosslinked material, and a fuel cell may include the electrolyte membrane.

43 Claims, 9 Drawing Sheets

U.S. PATENT DOCUMENTS

| | | | |
|---|---|---|---|
| 2009/0117440 A1* | 5/2009 | Choi et al. | 429/33 |
| 2010/0273087 A1* | 10/2010 | Choi et al. | 429/483 |
| 2011/0189581 A1* | 8/2011 | Choi et al. | 429/482 |

FOREIGN PATENT DOCUMENTS

| | | |
|---|---|---|
| DE | 2034 887 | 1/1972 |
| DE | 603 02 673 | 8/2006 |
| EP | 1 247 844 | 10/2002 |
| EP | 1 253 661 | 10/2002 |
| EP | 1 760 110 | 3/2007 |
| EP | 1 881 549 | 1/2008 |
| JP | 5-283082 | 10/1993 |
| JP | 10-25343 | 1/1998 |
| JP | 11-503262 | 3/1999 |
| JP | 11-97011 | 4/1999 |
| JP | 2001-19844 | 1/2001 |
| JP | 2001-270891 | 10/2001 |
| JP | 2001-271070 | 10/2001 |
| JP | 2002-260682 | 9/2002 |
| JP | 2003-12747 | 1/2003 |
| JP | 2003-12924 | 1/2003 |
| JP | 2003-286320 | 10/2003 |
| JP | 2003-327694 | 11/2003 |
| JP | 2004-43547 | 2/2004 |
| JP | 2004-103494 | 4/2004 |
| JP | 2004-149779 | 5/2004 |
| JP | 2004-179514 | 6/2004 |
| JP | 2005-41936 | 2/2005 |
| JP | 2005-82690 | 3/2005 |
| JP | 2005-283082 | 10/2005 |
| JP | 2006-339065 | 12/2006 |
| JP | 2007-70631 | 3/2007 |
| JP | 2007-214108 | 8/2007 |
| KR | 10-2006-0011831 | 2/2006 |
| KR | 10-2006-0055291 | 5/2006 |
| KR | 10-2007-0025626 | 3/2007 |
| KR | 10-2007-0025627 | 3/2007 |
| KR | 10-0745741 | 7/2007 |
| KR | 10-2007-0102579 | 10/2007 |
| WO | WO 96/13872 | 5/1996 |
| WO | WO 00/51992 | 9/2000 |
| WO | WO 02/14334 | 2/2002 |
| WO | WO 02/057279 | 7/2002 |
| WO | WO 03/072638 | 9/2003 |
| WO | WO 2004/009708 | 1/2004 |
| WO | WO 2004/101509 | 11/2004 |
| WO | WO 2005/000955 | 1/2005 |
| WO | WO 2006/132207 | 12/2006 |

OTHER PUBLICATIONS

U.S. Appl. No. 12/263,011, filed Oct. 31, 2008, Seong-woo Choi et al., Samsung Electronics Co., Ltd.
U.S. Appl. No. 12/262,854, filed Oct. 31, 2008, Seong-woo Choi et al., Samsung Electronics Co., Ltd.
U.S. Appl. No. 11/947,011, filed Nov. 29, 2007, Seong-woo Choi et al., Samsung Electronics Co., Ltd.
U.S. Appl. No. 12/266,039, filed Nov. 6, 2008, Seong-woo Choi et al., Samsung Electronics Co., Ltd.
U.S. Appl. No. 12/208,492, filed Sep. 11, 2008, Seong-woo Choi et al., Samsung Electronics Co., Ltd.
U.S. Appl. No. 11/765,033, filed Jun. 19, 2007, Hee-Young Sun et al., Samsung Electronics Co., Ltd.
U.S. Appl. No. 11/765,056, filed Jun. 19, 2007, Kyung-jung Kwon et al., Samsung Electronics Co., Ltd.
European Search Report dated Jul. 21, 2010 issued in corresponding European Patent Application No. 10164784.0.
European Search Report dated Jul. 21, 2010 issued in corresponding European Patent Application No. 10164785.7.
Kim, Hyoung-Juhn et al. *Polybenzimidazoles for High Temperature Fuel Cell Application*. Macromol. Rapid Commun. 2004, 25, 1414.
Ueda, Mitsuru et al. *Poly(benzimidazole) Synthesis by Direct Reaction of Methoxyphthalic Acids and Tetramine*. J. Poly. Sci. Part A: Polym. Chem, 27m 2815 (1989).
Seong-Woo Choi et al., "Synthesis, characterization and thermal degradation of functional benzoxazine monomers and polymers containing phenylphosphine oxide", Polymer Degradation and Stability 91 (2006), pp. 1166-1178.
Korean Office Action dated Jul. 21, 2010, issued in corresponding Korean Patent Application No. 10-2008-0089999.
Machine translation of JP 2004-149779, Sakaguchi et al., May 2004.
Korean Office Action dated Oct. 6, 2010, issued in corresponding Korean Patent Application No. 10-2008-0099549.
212th ECS Meeting—Washington DC, Oct. 7-12, 2007, Program Information, B10—Proton Exchange Membrane Fuel Cells (PEMFC 7) Energy Technology/Physical and Analytical Electrochemistry/Battery/Industrial Electrochemistry and Electrochemical Engineering.
Search Report issued in European Patent Application No. 08166328.8 on Jan. 22, 2009.
U.S. Office Action dated Jul. 11, 2011, issued in corresponding U.S. Appl. No. 12/208,492.
B. Antalek. "Using Pulsed Gradient Spin Echo NMR for Chemical Mixture Analysis: How to Obtain Optimum Results.", Concepts in Magnetic Resonance (2002) vol. 14(4), pp. 225-258.
S. Viel et al. "Diffusion-Ordered NMR Spectroscopy: A Versatile Tool for the Molecular Weight Determination of Uncharged Polysaccharides.", Biomacromolecules (2003) vol. 4, pp. 1843-1847.
D. A. Jayawickrama et al. "Polymer additives mixture analysis using pulsed-field gradient NMR spectroscopy.", Magn.Reson. Chem (1998), vol. 36, pp. 755-760.
K. Nishinari et al. " Soulution Properties of Pullulan.", Macromolecules (1991) vol. 24, pp. 5590-5593.
L.C. Van Gorkom et al. "Analysis of DOSY and GPC-NMR Experiments on Polymers by Multivariate Curve Resolution.", Journal of Magnetic Resonance (1998) vol. 130, pp. 125-130.
A. Chen et al. "Determination of Molecular Weight Distributions for Polymers by Diffusion-Ordered NMR.", J. Am. Chem. Soc. (1995) vol. 117, pp. 7965-7970.
Hajime Kimura et al. "Epoxy Resin Cured by Bisphenol A Based Benzoxazine.", Journal of Applied Polymer Science (1998), vol. 68, pp. 1903-1910.
Schuster, Martin F.H., et al., "Anhydrous Proton-Conducting Polymers", Annu. Rev. Mater. Res., vol. 33, 2003, pp. 233-261.
Yamada, M. et al., "Anhydrous proton conducting polymer electrolytes based on poly(vinylphosphonic acid)-heterocyclic composite material", Polymer, vol. 46, No. 9, 2005, pp. 2986-2992.
Pu, H., et al., "Proton Transport in Polybenzimidazole Blended with $H_3PO_4$ or $H_2SO_4$", J. Polymer Science, Part B: Polymer Physics, vol. 40, 2002, pp. 663-669.
Choi et al., "Synthesis, characterization and thermal degradation of functional benzoxazine monomers and polymers containing phenylphosphine oxide", Polymer Degradation and Stability, vol. 91, No. 5, May 1, 2006, pp. 1166-1178.
Low, Hong Yee, et al. "Structural Effects of Phenols on the Thermal and Thermo-oxidative Degradation of Polybenzoxazines". Polymer, vol. 40, No. 15. Jul. 1999. pp. 4365-4376.
Kim, H.J., et al. "Synthesis and Thermal Characterization of Polybenzoxazines Based on Acetylene-functional Monomers". Polymer, vol. 40, No. 23. Nov. 1999. pp. 6565-6573.
Shen, Shyan Bob, et al. "Synthesis and Characterization of Polyfunctional Naphthoxazines and Related Polymers". Journal of Applied Polymer Science vol. 61, No. 9. 1996, pp. 1595-1605.
Lin et al., "Synthesis and Properties of Flame-Retardant Benzoxazines by Three Approaches", Journal of Polymer Science, Part A: Polymer Chemistry, vol. 44, 2006, pp. 3454-3468.
Hirai et al., "Air-Induced *anti*-Markovnikov Addition of Secondary Phosphine Oxides and H-Phosphinates to Alkenes", National Institute of Advanced Industrial Science and Technology, Organic Letters 2007, vol. 9, No. 1, pp. 53-55.
Beletskaya et al., "Arylation of 6H-Dibenzo[c,e][1,2 $\lambda^5$]oxaphosphinine 6-Oxide", Russian Journal of Organic Chemistry, vol. 40, No. 12, 2004, pp. 1782-1786.
Yamada et al., "A Novel Synthesis of 6-Hydroxyalkyl- and 6-Hydroxy-aralkyl-6H-dibenz[c,e][1,2]oxaphosphorin 6-Oxides", vol. 27, 1990, pp. 845-850.
Human translation of JP 2003-286320, A. Takeichi et al., Oct. 2003.
Human translation of JP 2004-103494, Kimura et al., Apr. 2004.
European Search Report issued in European Patent Application No. 06254551.2-2115 on Nov. 21, 2006.

European Office Action issued in corresponding European Patent Application No. 07250814.6 on Oct. 30, 2007.
European Search Report issued in European Patent Application No. 08104319.2 on Oct. 13, 2008.
European Search Report issued in European Patent Application No. 08157494.9 on Nov. 24, 2008.
European Office Action issued in corresponding EP Application No. 08164095.5 on Dec. 4, 2008.
European Search Report issued in European Patent Application No. 08164096.3 on Jan. 20, 2009.
European Search Report issued in European Patent Application No. 08168081.1 on Jan. 28, 2009.
Extended European Search Report issued in European Patent Application No. 08168032.4 on Feb. 3, 2009.
European Search Report issued in European Patent Application No. 08168404.5 on Feb. 10, 2009.
Extended European Search Report issued in European Patent Application No. 08168404.5 on Apr. 23, 2009.
Japanese Office Action issued in Japanese Patent Application No. 2006-239572 on Feb. 17, 2009.
US Office Action issued in corresponding U.S. Appl. No. 11/947,011 on Jun. 22, 2009.
US Office Action issued in corresponding U.S. Appl. No. 11/947,011 on Jan. 15, 2010.
US Office Action issued in corresponding U.S. Appl. No. 11/947,011 on Mar. 30, 2010.
US Office Action issued in corresponding U.S. Appl. No. 11/514,254 on Jan. 8, 2010.
US Office Action issued in corresponding U.S. Appl. No. 11/514,254 on May 6, 2010.
US Office Action issued in corresponding U.S. Appl. No. 11/765,033 on Sep. 8, 2009.
US Office Action issued in corresponding U.S. Appl. No. 11/765,033 on Jun. 17, 2010.
US Office Action issued in corresponding U.S. Appl. No. 11/743,778 on Sep. 3, 2009.
US Office Action issued in corresponding U.S. Appl. No. 11/743,778 on Feb. 19, 2010.
US Office Action issued in corresponding U.S. Appl. No. 11/765,056 on Jun. 1, 2010.
Japanese Office Action dated Sep. 20, 2011, issued in corresponding Japanese Patent Application No. 2008-233675.
U.S. Office Action dated Nov. 14, 2011, issued in corresponding U.S. Appl. No. 12/208,492.
U.S. Office Action dated Dec. 12, 2011, issued in corresponding U.S. Appl. No. 12/263,011.
Japanese Office Action dated Jun. 21, 2011, issued in corresponding Japanese Patent Application No. 2007-309320.
U.S. Office Action dated Aug. 18, 2011, issued in corresponding U.S. Appl. No. 12/266,039.
U.S. Office Action dated Aug. 31, 2011, issued in corresponding U.S. Appl. No. 12/208,664.
U.S. Office Action dated Sep. 2, 2011, issued in corresponding U.S. Appl. No. 12/262,854.
U.S. Office Action dated Sep. 12, 2011, issued in corresponding U.S. Appl. No. 12/263,011.
Tarek Agag, Journal of Applied Polymer Science, vol. 100, pp. 3769-3777 (2006).
U.S. Office Action dated Jan. 20, 2012, issued in corresponding U.S. Appl. No. 11/947,011.
U.S. Notice of Allowance dated Jan. 31, 2012, issued in corresponding U.S. Appl. No. 12/266,039.
U.S. Office Action dated Feb. 2, 2012, issued in corresponding U.S. Appl. No. 12/208,664.
U.S. Notice of Allowance dated Feb. 3, 2012, issued in corresponding U.S. Appl. No. 12/208,492.
U.S. Notice of Allowance dated Feb. 3, 2012, issued in corresponding U.S. Appl. No. 12/262,854.
STN Registry database entries for RN 35141-82-3, RN 35141-83-4 and RN 35141-84-5, Database entry date Nov. 16, 1984. Accessed Jan. 26, 2012.
Japanese Office Action dated Oct. 23, 2011, issued in corresponding Japanese Patent Application No. 2007-309320.

* cited by examiner

POLYBENZIMIDAZOLE-BASE COMPLEX, CROSSLINKED MATERIAL OF POLYBENZOXAZINES FORMED THEREOF, AND FUEL CELL USING THE SAME

CROSS-REFERENCE TO RELATED APPLICATION

This application claims the benefit of Korean Patent Application No. 2007-102579, filed on Oct. 11, 2007, in the Korean Intellectual Property Office, the disclosure of which is incorporated herein in its entirety by reference.

BACKGROUND OF THE INVENTION

1. Field of the Invention

Aspects of the present invention relate to a polybenzimidazole-base complex, a crosslinked material of polybenzoxazines formed thereof, and a fuel cell using the same.

2. Description of the Related Art

In conventional ionic conductors, ions are moved by applying a voltage thereto. Ionic conductors are widely used in electrochemical devices such as fuel cells, electrochemical sensors, and the like.

For example, in terms of generating efficiency, system efficiency, and long-term durability of components, fuel cells may use a proton conductor that can provide long-term stable proton conductivity at an operating temperature of 100 to 300° C. under non-humidified conditions or low-humidified conditions with a relative humidity of 50% or less.

The above specifications have been considered in the development of conventional solid polymer-type fuel cells. However, solid polymer-type fuel cells that include a perfluorocarbonsulfonic acid membrane as an electrolyte membrane generate insufficient energy at an operating temperature of 100 to 300° C. at a relative humidity of 50% or less.

Conventional fuel cells include fuel cells using an electrolyte membrane containing a proton conducting agent, fuel cells using a silica diffusion membrane, fuel cells using an inorganic-organic composite membrane, fuel cells using a phosphoric acid-doped graft membrane, and fuel cells using an ionic liquid composite membrane.

In addition, a solid polymer electrolyte membrane formed of polybenzimidazole (PBI) in which a strong acid, such as a phosphoric acid or the like, is doped has been disclosed (in U.S. Pat. No. 5,525,436).

The solid polymer electrolyte membrane formed of PBI described above has excellent thermal stability compared with other polymer electrolyte membranes, and thus is a suitable type of electrolyte membrane.

However, a method of preparing PBI polymer, which is well known, is a process in which PBI polymer is synthesized in a highly viscous solution under a strong acid atmosphere (Macromol. Rapid Commun. 2004, 25, 1410, J. Poly. Sci. Part A: Polym. Chem, 1989, 27, 2815). Thus, it is also well known that in each batch used in the synthesis processes, it is difficult to obtain PBI with constant physical properties.

In particular, in the above process, PBI is synthesized by a heat treatment under an acid atmosphere, and the reactants and products mainly have an amine or imine functional group, which is basic, thereby being easily protonated from the surrounding environments to have a positive charge. Therefore, it is difficult to separate pure PBI using separation methods such as general GPC, HPLC, or the like. In addition, U.S. Pat. No. 5,525,436 discloses a method of using PBI as a polymer electrolyte membrane for a fuel cell, in which the PBI is impregnated with a strong acid solution such as a concentrated phosphoric acid. However, impurities such as unreacted monomers or oligomers cannot be separated from the prepared polymer product, and thus, the impurities are allowed to remain, with disregard for their impact.

In addition, when a solid polymer electrolyte membrane prepared by doping the PBI polymer prepared using the preparation method described above with a strong acid such as a phosphoric acid is applied in a fuel cell, problems, such that characteristics of the fuel cell are not constantly obtained, mechanical strength of the fuel cell is easily degraded, or an initial activation time of the fuel cell becomes longer, frequently occur. Therefore, further improvement is desirable.

SUMMARY OF THE INVENTION

Aspects of the present invention provide a polybenzimidazole-base complex, a crosslinked material formed of the polybenzimidazole-base complex and one or more polybenzoxazines formed thereof, an electrolyte membrane using a crosslinked material formed of the polybenzimidazole-base complex and a benzoxazine-based monomer, and a fuel cell using the electrolyte membrane.

According to an embodiment of the present invention, there is provided a polybenzimidazole-base complex comprising a polybenzimidazole-based material and a base, wherein in an $^1$H nuclear magnetic resonance ($^1$H-NMR) of the polybenzimidazole-base complex, a peak corresponding to NH of an imidazole ring of the polybenzimidazole-based material does not appear at a chemical shift of 12 to 15 ppm.

According to an aspect of the present invention, a peak of the polybenzimidazole-base complex may be detected at a chemical shift of 9.14±0.5, 8.32±0.5, 7.92±0.5, 7.75±0.5, and 7.62±0.5 by $^1$H-NMR operating at 300 MHz.

According to an aspect of the present invention, the base may be at least one selected from the group consisting of sodium carbonate ($Na_2CO_3$), sodium hydrogen carbonate ($NaHCO_3$), potassium carbonate ($K_2CO_3$), potassium hydrogen carbonate ($KHCO_3$), lithium carbonate ($Li_2CO_3$), rubidium carbonate ($Rb_2CO_3$), cesium carbonate ($Cs_2CO_3$), ammonium carbonate (($NH_4)_2CO_3$), and ammonium hydrogen carbonate (($NH_4)HCO_3$). The amount of the base may be in the range of 0.01 to 20 parts by weight based on 100 parts by weight of the polybenzimidazole-based material.

According to an aspect of the present invention, an amount of a metal ion measured by inductively coupled plasma (ICP) analysis of the polybenzimidazole-base complex may be in the range of 300 to 1200 ppm, or more specifically in the range of 323 to 1170 ppm. A thermal decomposition initiation temperature of the polybenzimidazole-base complex may be in the range of 180 to 220° C.

According to an aspect of the present invention, a ratio of a weight average molecular weight to a number average molecular weight (Mw/Mn) of the polybenzimidazole-base complex may be in the range of 2.1:1 to 2.5:1.

According to an aspect of the present invention, the polybenzimidazole-base complex may have a weight average molecular weight of 65,000 to 70,000, and a number average molecular weight of 25,000 to 30,000.

According to another embodiment of the present invention, there is provided a method of preparing a polybenzimidazole-base complex, comprising: dissolving a polybenzimidazole-based material in an organic solvent to obtain a polybenzimidazole solution, adding a base to the polybenzimidazole solution and mixing the mixture, and then heat treating the resultant.

According to another embodiment of the present invention, there is provided an electrolyte membrane for a fuel cell, comprising the polybenzimidazole-base complex described above.

According to another embodiment of the present invention, there is provided a fuel cell comprising a cathode; an anode; and an electrolyte membrane disposed therebetween, wherein the electrolyte membrane comprises the polybenzimidazole-base complex described above.

According to another aspect of the present invention, there is provided a crosslinked material comprising a polymerized product of (i) the polybenzimidazole-base complex described above, and (ii) at least one selected from a first benzoxazine-based monomer represented by Formula 3 below and a second benzoxazine-based monomer represented by Formula 4 below:

<Formula 3>

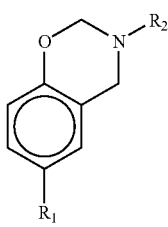

wherein $R_1$ is hydrogen, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_2$-$C_{20}$ heteroaryl group, a substituted or unsubstituted $C_4$-$C_{20}$ cycloalkyl group, a substituted or unsubstituted $C_2$-$C_{20}$ heterocyclic group, a halogen atom, a hydroxyl group, or a cyano group, $R_2$ is a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group, <Formula 4>

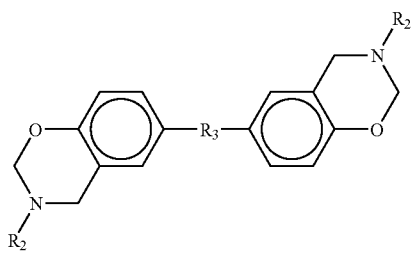

wherein $R_2$ is a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group, $R_3$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO_2—.

According to another embodiment of the present invention, there is provided an electrolyte membrane comprising the crosslinked material described above.

According to another embodiment of the present invention, there is provided a fuel cell including the electrolyte membrane comprising the crosslinked material described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
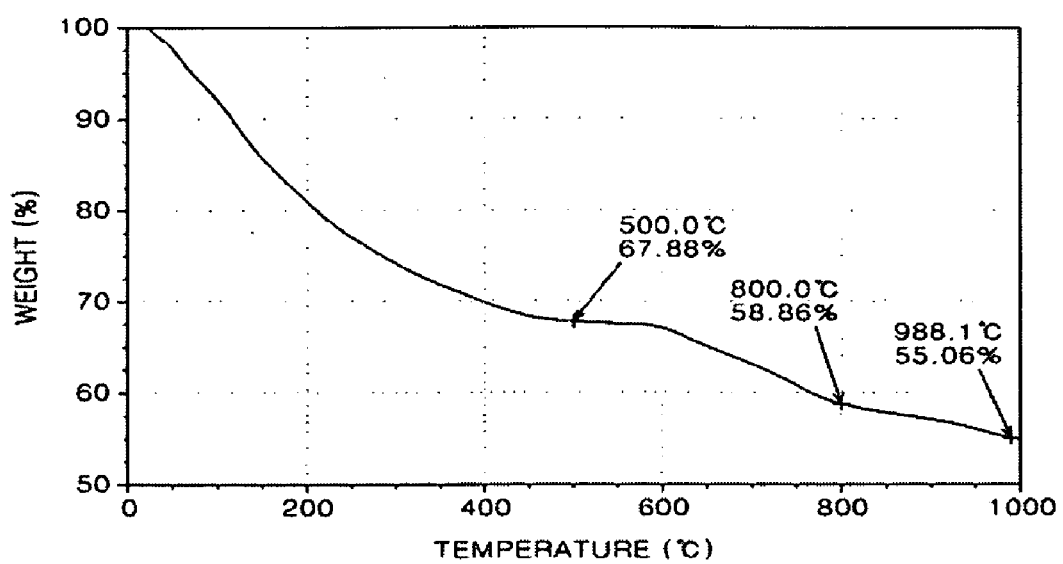
FIG. 1 is a graph showing thermogravimetric analysis (TGA) results of PBI prepared in Comparative Preparation Example 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention provide a polybenzimidazole-base complex, which is a product obtained by reacting a polybenzimidazole solution in which a polybenzimidazole-based material is dissolved in an organic solvent with a base, and then heat treating the resultant.

The base may be a weak base, such as, for example, at least one carbonate selected from the group consisting of sodium carbonate ($Na_2CO_3$), sodium hydrogen carbonate ($NaHCO_3$), potassium carbonate ($K_2CO_3$), potassium hydrogen carbonate ($KHCO_3$), lithium carbonate ($Li_2CO_3$), rubidium carbonate ($Rb_2CO_3$), cesium carbonate ($Cs_2CO_3$), ammonium carbonate (($NH_4$)$_2CO_3$), and ammonium hydrogen carbonate (($NH_4$)$HCO_3$). The amount of the base may be in the range of 0.01 to 20 parts by weight based on 100 parts by weight of the polybenzimidazole-based material.

When the amount of the base is less than 0.01 parts by weight based on 100 parts by weight of the polybenzimidazole-based material, the polybenzimidazole-base complex may not be completely formed. On the other hand, when the amount of the base is greater than 20 parts by weight based on 100 parts by weight of the polybenzimidazole-based material, the viscosity of the composition that forms the polybenzimidazole-base complex is increased, and thus components including the base cannot be uniformly dispersed in the composition that forms the polybenzimidazole-base complex.

The term "polybenzimidazole-based material" refers to a polymer material that includes benzimidazole units. (Herein, the term "polybenzimidazole-based material" should not be confused with the term "polybenzimidazole-base complex," which, as noted above, refers to a product obtained by reacting a polybenzimidazole solution in which a polybenzimidazole-based material is dissolved in an organic solvent with a base, and then heat treating the resultant). As specific, non-limiting examples, the polybenzimidazole-based material may be poly[2,2'-(m-phenylene)-5,5'-bibenzimidazole] (PBI) or poly(2,5-benzimidazole) (ABPBI).

A method of preparing the polybenzimidazole-base complex according to aspects of the present invention is as follows. First, a polybenzimidazole-based material is completely dissolved in an organic solvent to obtain a polybenzimidazole solution. The organic solvent may be any solvent that dissolves the polybenzimidazole-based material. As non-limiting examples, the organic solvent may be at least one selected from the group consisting of dimethylacetamide, dimethylformamide, dimethylsulfoxide, and 1-methyl-2-pyrolidine (NMP).

The amount of the organic solvent may be adjusted to obtain solution containing 10 to 20 wt % of the polybenzimidazole-based material in the organic solvent. When the amount of the organic solvent added results in a solution containing less than 10 wt % of the polybenzimidazole-based material in the solution, the polybenzimidazole-based material is not uniformly dissolved; on the other hand, when the amount of the organic solvent added results in greater than 20 wt % of the polybenzimidazole-based material in the solution, the polybenzimidazole-based material is not easily dispersed and the formation of a complete complex is difficult.

Subsequently, a base is added to the polybenzimidazole solution, and the resultant is heat treated. Then, the heat-treated resultant is filtered to obtain a desired polybenzimidazole-base complex.

A temperature of the heat treatment may be in the range of 60 to 150° C. When the temperature of the heat treatment is less than 60° C., the base may not be easily mixed and dispersed in the polybenzimidazole solution; on the other hand, when the temperature of the heat treatment is greater than 150° C., the formation of the polybenzimidazole-base complex is not fully performed.

The formation of the polybenzimidazole-base complex can be confirmed through a nuclear magnetic resonance (NMR) analysis. An instrument that may be used in such NMR analysis is a Bruker NMR 300 MHz spectrometer (model name: DPX 300) commercially available from Bruker Biospin. The NMR analysis may be performed using a 0.8 ml sample of a resultant solution prepared by dissolving 10 mg of the polybenzimidazole-base complex in 0.7 mL of DMSO d6.

In addition, thermogravimetric analysis (TGA), including the thermal decomposition initiation temperature, thermal decomposition rate and 10% weight loss temperature in the TGA curve, may performed using a TA Instrument TGA 2050 thermogravimetric analyzer. The thermogravimetric analysis may be performed at a temperature ramp from room temperature to 1000° C. (at a rate of 8 to 15° min or more specifically, 10° C./min), and performed using a Pt pan under a nitrogen ($N_2$) gas atmosphere.

The thermal decomposition initiation temperature of the polybenzimidazole-base complex prepared using the preparation process described above may be in the range of 180 to 220° C., or more specifically 200° C. In addition, the thermal decomposition rate of the polybenzimidazole-base complex at a heating temperature of 20 to 1000° C. may be in the range of 8 to 15° C./min, or more specifically 10° C./min, and a 10% weight loss temperature in the TGA curve may be in the range of 200 to 280° C., and particularly about 250° C.

The polybenzimidazole-base complex may have a ratio of weight average molecular weight to number average molecular weight ($M_w/M_n$, referred to as "molecular weight distribution") of 2.1:1 to 2.5:1, or more specifically, 2.4:1. The polybenzimidazole-base complex may have a weight average molecular weight of 65,000 to 70,000, or more specifically 69,000, and may have a number average molecular weight of 25,000 to 30,000, or more specifically 29,000, and may have a viscosity average molecular weight of 80,000 to 83,000, or more specifically about 82,000.

The weight average molecular weight, number average molecular weight and viscosity average molecular weight may be measured using a gel permeation chromatography (GPC) method. A TDA 302 analyzer available from Viscotek GPCmax may be used in the measurement of the molecular weights. In the GPC analysis, an eluent may be dimethylformamide (DMF) and 0.1 wt % of LiBr, a column may be PLGel Mixed-C*2 (temp: 40° C.), a flow rate may be about 1 ml/min, and an injection volume may be about 100 µl.

In addition, the $^1$H nuclear magnetic resonance ($^1$H-NMR) spectrum of the polybenzimidazole-base complex does not have a peak corresponding to a peak of NH of imidazole of a general polybenzimidazole-based material, at a chemical shift of 12 to 15 ppm. A peak is detected at a chemical shift of 9.15±0.5 (s, 1H), 8.30±0.5 (d, 2H), 7.92±0.5 (s, 1H), 7.75±0.5 (m, 3H), and 7.62±0.5 (m, 3H) using $^1$H-NMR operating at 300 MHz. Using $^1$H-NMR operating at 300 MHz, it can be seen that an NH peak at a chemical shift of 12 to 15 ppm, particularly around about 14 ppm, which is apparent in polybenzimidazole before the formation of the polybenzimidazole-base complex, disappears, and simultaneously, peaks of polybenzimidazole are accurately split in the range of 8.2 to 7.4 ppm to correspond to integration values.

The NH peak at a chemical shift of 12 to 15 ppm, particularly around about 14 ppm, disappears in the polybenzimidazole-base complex because the polybenzimidazole-based material reacts with the base, and while the resultant is heat treated, the —NH— moiety of polybenzimidazole participates in the reaction, thereby changing the magnetic characteristics in the environment surrounding H. In the NMR analysis, the solvent used for dissolving the polybenzimidazole-base complex may be DMSO-d6, DMF-d6, or the like, or more specifically, may be DMSO-d6.

The amount of metal ions (such as, for example, $Na^+$, $K^+$, $Ca^{2+}$, and the like) measured by inductively coupled plasma (ICP) analysis of the polybenzimidazole-base complex may be in the range of 300 to 1,200 ppm, or more specifically, in the range of 323 to 1,170 ppm. An ICP mass spectrometer such as the ICPS-8100 sequential spectrometer available from Shimadzu may be used in the determination of the amount of metal ions by ICP analysis.

A method of preparing the polybenzimidazole-based material of the present invention using a compound represented by Formula 1 below and a compound represented by Formula 2 below will now be described. However, the present invention is not limited thereto.

As a first preparation method, a method of preparing the compound of Formula 1 is as follows (Macromol. Rapid Commun. 2004, 25, 1410).

As shown in Reaction Scheme 1 below, 3,3'-diaminobenzidine and an isophthalic acid are used as starting materials, and phosphorous pentaoxide, a methansulfonic acid and a trifluoromethansulfonic acid are added thereto, and then the resultant is heat treated at 150° C. under a nitrogen atmosphere to obtain the compound of Formula 1.

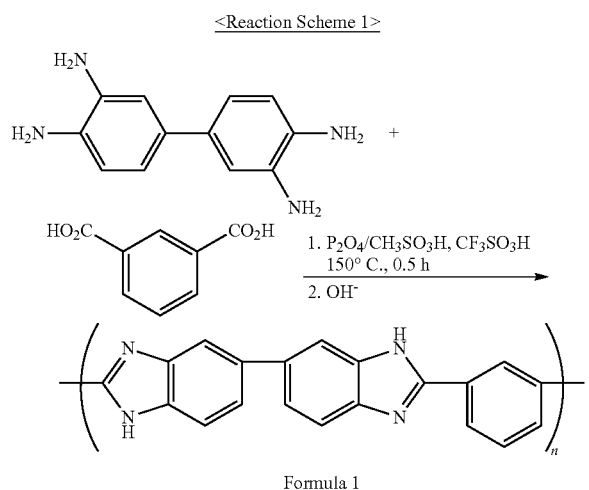

Formula 1

The value of n may be adjusted so that the compound of Formula 1 has a weight average molecular weight of 40,000 to 44,000.

As a second preparation method, a method of preparing the compound of Formula 2 is as follows (J. Poly. Sci. Part A: Polym. Chem, 27, 2815 (1989)).

As shown in Reaction Scheme 2 below, 3,3'-diaminobenzidine and a methoxyisophthalic acid are used as starting materials, and phosphorous pentaoxide and a methanesulfonic acid are added thereto, and then the resultant is heat treated at 140° C. under a nitrogen atmosphere to obtain the compound of Formula 2.

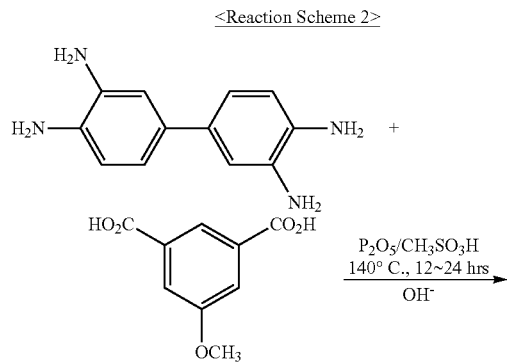

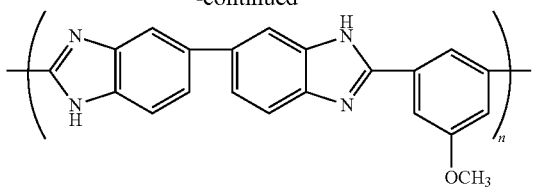

Formula 2

The value of n may be adjusted so that the compound of Formula 2 has a weight average molecular weight of 40,000 to 45,000.

The polybenzimidazole-base complex according to aspects of the present invention has high thermal stability and conductivity, and thus can be used as a material for forming an electrolyte membrane for a fuel cell. The polybenzimidazole-base complex is impregnated with a proton conductor such as acid to form an electrolyte membrane. A fuel cell employing the electrolyte membrane described above can have improved electric power generation at a high temperature under unhumidified conditions.

Non-restrictive examples of the proton conductor include a phosphoric acid, a phosphonic acid, a $C_1$-$C_{20}$ organic phosphonic acid, and the like. The $C_1$-$C_{20}$ organic phosphonic acid may be ethyl phosphonic acid, methyl phosphonic acid, vinyl phosphonic acid, and the like.

The amount of the proton conductor may be in the range of 300 to 1,000 parts by weight based on 100 parts by weight of the total weight of the electrolyte membrane. The concentration of the acid used is not particularly limited. As a non-limiting example, when a phosphoric acid is used, the phosphoric acid may be in the form of an 85 wt % aqueous phosphoric acid solution, and the impregnation time of the phosphoric acid may be in the range of 2.5 to 14 hours at 80° C.

Aspects of the present invention also provide a crosslinked material comprising a polymerized product of a polybenzimidazole-base complex as described above and at least one monomer selected from a first benzoxazine-based monomer represented by Formula 3 below and a second benzoxazine-based monomer represented by Formula 4 below:

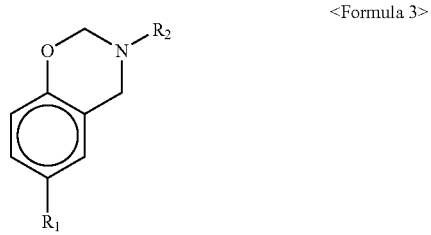

<Formula 3> wherein $R_1$ is hydrogen, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_2$-$C_{20}$ heteroaryl group, a substituted or unsubstituted $C_4$-$C_{20}$ cycloalkyl group, a substituted or unsubstituted $C_2$-$C_{20}$ heterocyclic group, a halogen atom, a hydroxyl group, or a cyano group, and $R_2$ is a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group, <Formula 4>

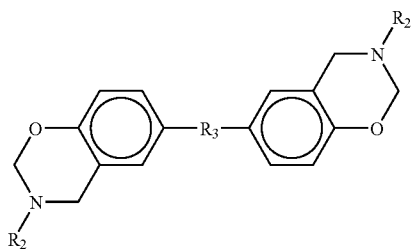

wherein $R_2$ is as defined above, and $R_3$ is selected from the group consisting of a substituted or unsubstituted $C_2$-$C_{20}$ alkylene group, a substituted or unsubstituted $C_2$-$C_{20}$ alkenylene group, a substituted or unsubstituted $C_1$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—.

A more detailed explanation of the particular terms used in the definition of $R_2$ and $R_3$ is provided below. It is to be understood that $R_2$ may be independently selected in Formula 3 and Formula 4.

The crosslinked material comprising a polymerized product of a polybenzimidazole-base complex as described above and at least one monomer selected from a first benzoxazine-based monomer represented by Formula 3 below and a second benzoxazine-based monomer represented by Formula 4 may be referred to herein as "the crosslinked material" for brevity.

The crosslinked material may be a polymerized resultant product of a first benzoxazine-based monomer represented by Formula 6 below, a second benzoxazine-based monomer represented by Formula 16 below, and the polybenzimidazole-base complex:

<Formula 6>

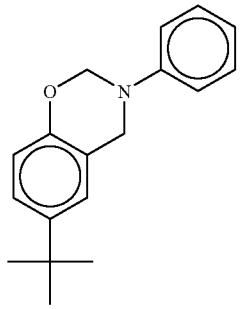

<Formula 16>

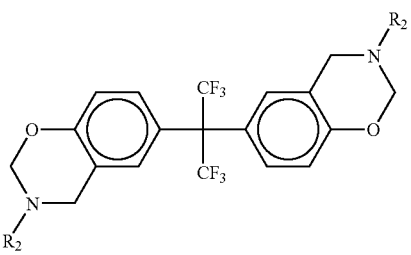

wherein $R_2$ is a phenyl group.

According to aspects of the present invention, when the first benzoxazine-based monomer and the second benzoxazine-based monomer are used together, an amount of the second benzoxazine-based monomer may be in the range of 0.5 to 50 parts by weight, or more specifically 1 to 10 parts by weight based on 100 parts by weight of the first benzoxazine-based monomer. The first benzoxazine-based monomer may be used as a monomer for forming a polymer matrix used to form an electrolyte membrane by polymerizing the first benzoxazine-based monomer with the polybenzimidazole-base complex, and the second benzoxazine-based monomer may be used as an additive when the electrolyte membrane is formed. In Formulae 3 and 4, as specific, non-limiting examples, $R_2$ may be a phenyl group, —CH$_2$—CH=CH$_2$, or a group represented by the following formulae.

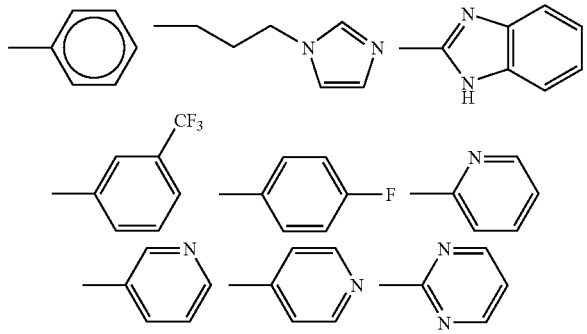

In Formula 4, if $R_3$ is —C(CH$_3$)$_2$—, —C(CF$_3$)$_2$—, —C(=O)—, —SO$_2$—, —CH$_2$—, —C(CCl$_3$)—, —CH(CH$_3$)—, or —CH(CF$_3$)—, the second benzoxazine-based monomer is a difunctional benzoxazine-based compound containing two benzoxazine rings. If $R_3$ is a group represented by the formula below, the second benzoxazine-based monomer is a trifunctional benzoxazine-based compound containing three benzoxazine rings.

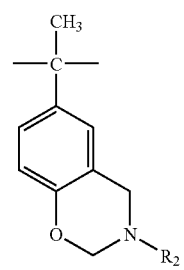

As non-limiting examples, the first benzoxazine-based monomer of Formula 3 may be one of the compounds represented by Formulae 5 through 14 below.
<Formula 5>
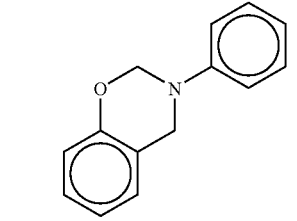
<Formula 6>
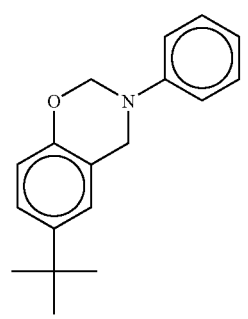
<Formula 7>
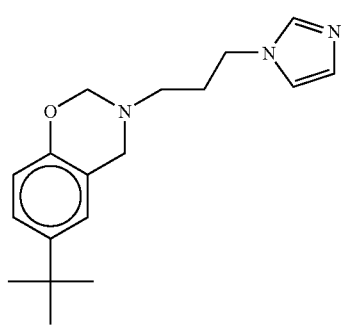
<Formula 8>
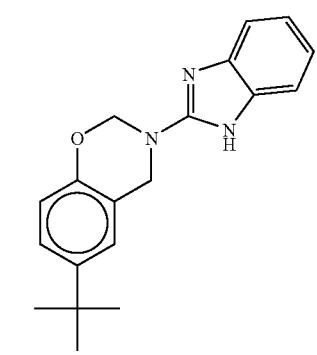
<Formula 9>
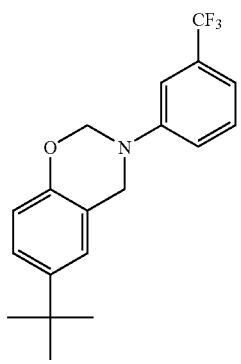
<Formula 10>
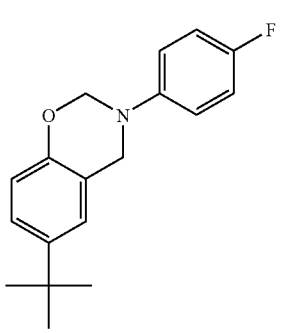
<Formula 11>
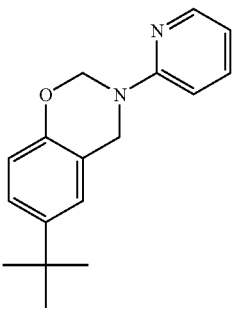
<Formula 12>
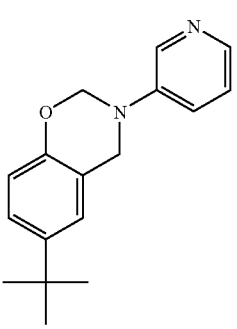
<Formula 13>
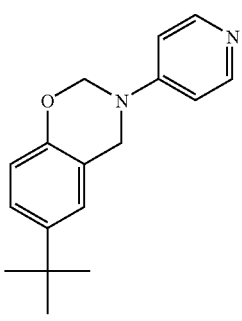

<Formula 14>

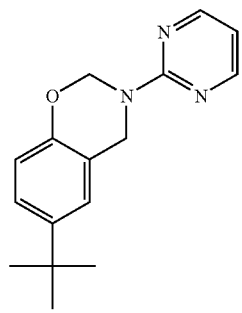

As non-limiting examples, the second benzoxazine-based monomer of Formula 4 may be one of the compounds represented by Formulae 15 through 19 below.

<Formula 15>

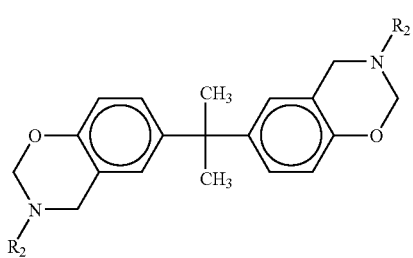

<Formula 16>

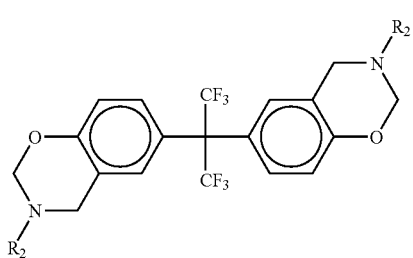

<Formula 17>

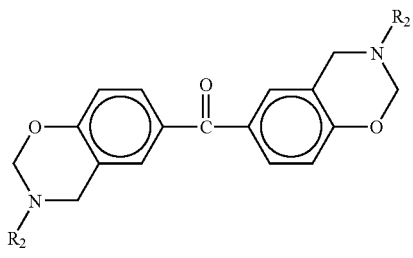

<Formula 18>

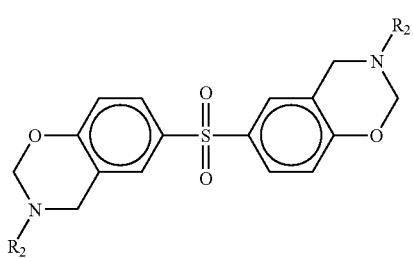

<Formula 19>

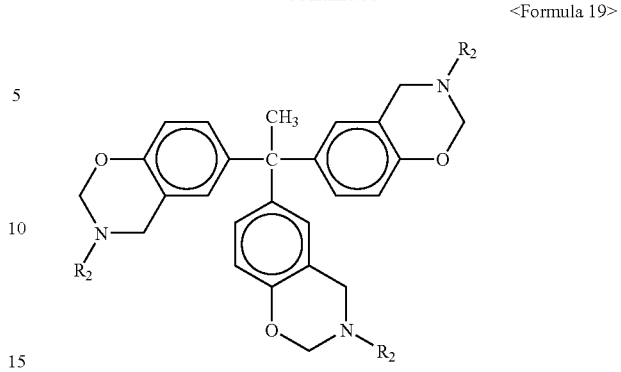

wherein $R_2$ is a phenyl group, $-CH_2-CH=CH_2$, or a group represented by the following formulae.

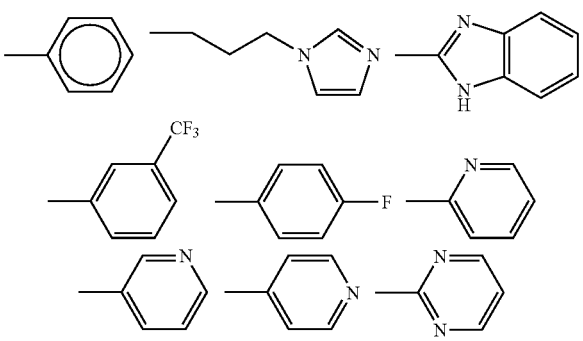

A method of synthesizing the crosslinked material formed of a polymerized product of the first benzoxazine-based monomer of Formula 3, the second benzoxazine-based monomer of Formula 4 and the polybenzimidazole-base complex, is as follows.

At least one selected from the first benzoxazine-based monomer of Formula 3 and the second benzoxazine-based monomer of Formula 4, and the polybenzimidazole-base complex are mixed in a predetermined ratio.

The amount of the polybenzimidazole-base complex may be in the range of 5 to 95 parts by weight based on 100 parts by weight of the total weight of the at least one selected from the first benzoxazine-based monomer and the second benzoxazine-based monomer.

When the amount of the polybenzimidazole-base complex is less than 5 parts by weight, the electrolyte membrane may not be impregnated with a phosphoric acid, and thus proton conductivity of the electrolyte membrane may be reduced. On the other hand, when the amount of the polybenzimidazole-base complex is greater than 95 parts by weight, the crosslinked material may be dissolved in polyphosphoric acid due to the presence of excessive phosphoric acid so that gas permeation occurs.

If both the first benzoxazine-based monomer of Formula 3 and the second benzoxazine monomer of Formula 4 are used, the amount of the second benzoxazine-based monomer of Formula 4 may be in the range of 0.5 to 50 parts by weight, or more specifically in the range of 1 to 10 parts by weight based on 100 parts by weight of the first benzoxazine-based monomer of Formula 3. When the amount of the second benzoxazine-based monomer of Formula 4 is less than 0.5 parts by weight, the physical and chemical properties of an electrolyte membrane in more than a critical impregnation amount of a proton conductor such as a phosphoric acid may be degraded. On the other hand, when the amount of the second benzoxazine-based monomer of Formula 4 is greater than 50 parts by weight based on 100 parts by weight, the crosslinking density of the polybenzimidazole-base complex may be highly concentrated so that doping of a proton conductor may not be easy.

Next, the mixture is cured to obtain a crosslinked material through an intercrosslinking reaction. That is, the first benzoxazine-based monomer and the second benzoxazine-based monomer are polymerized (cured) with the polybenzimidazole-base complex through thermal ring opening polymerization to form a polymer matrix. In addition, the polymerization reaction proceeds with a gradual adjustment of temperature, and may be performed at a temperature for the curing reaction and at a reaction time of at least 7 hours to form a network structure.

The temperature of the curing reaction varies depending on characteristics of the first benzoxazine-based monomer, the second benzoxazine-based monomer, and the polybenzimidazole-base complex, but is typically in the range of 50 to 250° C. When the temperature of the curing reaction is less than 50° C., the curing reaction itself may not be performed; on the other hand, when the temperature of the curing reaction is greater than 250° C., unreacted materials may be obtained.

The time of the curing reaction depends on the temperature of the curing reaction, and may be at least 7 hours, or more specifically, in the range of 8 to 20 hours at the temperature range described above.

Chemical and physical properties of the crosslinked material formed of a polymerized product of at least one selected from the first benzoxazine-based monomer of Formula 1 and the second benzoxazine-based monomer of Formula 2 and a cross-linkable compound are as follows.

The crosslinked material has thermosetting properties, and thus is not dissolved in an organic solvent, acid, or base. Therefore, the molecular weight of the crosslinked material is difficult to measure using gel permeation chromatography (GPC), which is the most general method used to obtain the molecular weight of existing polymers.

The crosslinked material has the strong acid trapping ability of the benzoxazine-based compound, has improved mechanical characteristics due to crosslinking, and is not dissolved in a polyphosphoric acid, and thus is very chemically stable. An electrolyte membrane prepared using the crosslinked material has excellent phosphoric acid retention, and has also improved mechanical and chemical stability. In addition, the crosslinked material can be obtained using a polymerization process that does not require a polymerization initiator or a separate cross-linking agent, but simply uses heat. Thus, mass production of the crosslinked material is easy in terms of preparation process. In addition, the starting material used in synthesis of the crosslinked material is very inexpensive. Thus, manufacturing costs can be reduced.

In particular, the electrolyte membrane formed of the crosslinked material has highly maintained mechanical and chemical stabilities even when an impregnation amount of a proton conductor such as a phosphoric acid is increased in order to increase proton conductivity, and thus can be usefully used in a fuel cell for operation at high temperature under unhumidified conditions.

A method of preparing an electrolyte membrane using the crosslinked material, according to an embodiment of the present invention, is as follows.

As a first method, at least one selected from the first benzoxazine-based monomer of Formula 3 and the second benzoxazine-based monomer of Formula 4 described above, and the polybenzimidazole-base complex as also described above are blended, and then the mixture is cured at a temperature in the range of 50 to 250° C., and particularly in the range of 80 to 220° C. Subsequently, the resultant is impregnated with a proton conductor such as acid to form an electrolyte membrane.

As a second method, at least one selected from the first benzoxazine-based monomer of Formula 3 and the second benzoxazine-based monomer of Formula 4 and the polybenzimidazole-base complex as described above are mixed together. Using the mixture, an electrolyte membrane is formed.

The formation of the electrolyte membrane may be performed using a tape casting method or a conventional coating method. The conventional coating method may be a method in which the mixture is cast onto a support using a doctor blade. Herein, a doctor blade with a 250 to 500 μm gap may be used.

When the casting method using a doctor blade is used, the process of forming the electrolyte membrane further includes separating the electrolyte membrane from the support, between the time when curing of the mixture occurs and the time when impregnation of the resultant with acid occurs. To perform the process of separating the electrolyte membrane from the support, the cured mixture is immersed in distilled water at a temperature in the range of 60 to 80° C.

The support can be any support that can support an electrolyte membrane, such as, for example, a glass substrate, a polyimide film, a polyethyleneterephthalate film, or the like. When the tape casting method is used, a tape cast membrane is separated from a support such as polyethyleneterephthalate before being cured, and then put into an oven.

In addition, when a membrane is formed by the tape casting method using a mixture of the at least one benzoxazine-based monomer and the polybenzimidazole-base complex, a process of filtering the mixture may be further performed. The tape cast membrane is cured by heat treatment, and then is impregnated with a proton conductor such as acid to form an electrolyte membrane.

The proton conductor may be the same as described above with respect to forming an electrolyte membrane using the polybenzimidazole-base complex by itself (that is, without a benzoxazine-based monomer and may be used in the same amounts as described above.

The electrolyte membrane prepared using the crosslinked material can be used as a hydrogen ion conductive membrane for a fuel cell.

A method of manufacturing a membrane-electrode assembly for a fuel cell using the electrolyte membrane is as follows. The term "membrane-electrode assembly (MEA)" used herein refers to a structure in which electrodes, each comprising a catalyst layer and a diffusion layer, are deposited on respective surfaces of the electrolyte membrane.

The MEA may be formed by positioning electrodes including the catalyst layer at respective sides of the electrolyte membrane prepared using the processes described above, and then joining the electrolyte membrane and the electrodes together at a high temperature and under a high pressure, or coating on a polymer film a composition for an electrode catalyst layer, the composition including a catalyst metal, and then joining a fuel diffusion layer to the polymer membrane.

Herein, the joining is performed under a pressure in the range of 0.1 to 3 ton/cm$^2$, and particularly about 1 ton/cm$^2$, in a state reached when the MEA is heated up to a temperature that softens the electrolyte membrane (for example, up to about 125° C.).

Next, a bipolar plate is disposed on each side of the MEA to manufacture a fuel cell. The bipolar plate has grooves that supply fuel, and functions as a current collector.

As non-limiting examples, the catalyst used in the preparation of the MEA may be platinum alone, or an alloy or mixture of platinum and at least one metal selected from the group consisting of gold, palladium, rhodium, iridium, ruthenium, tin, molybdenum, cobalt, and chrome.

The particular type of the fuel cell according to aspects of the present invention is not particularly limited. However, the fuel cell may be preferably be a polymer electrolyte membrane (PEM) fuel cell.

An explanation of the terms used in defining the substituents $R_2$ and $R_3$ used in Formulae 3 and 4 is as follows.

The term "$C_1$-$C_{20}$ alkyl group" as used herein refers to methyl, ethyl, propyl, isobutyl, sec-butyl, pentyl, iso-amyl, hexyl, or the like. The $C_1$-$C_{20}$ alkyl group may be unsubstituted, or at least one hydrogen atom of the alkyl group may be substituted with a halogen atom, a $C_1$-$C_{20}$ alkyl group substituted with a halogen atom (for example, $CCF_3$, $CHCF_2$, $CH_2F$, $CCl_3$, and the like), a hydroxyl group, a nitro group, a cyano group, an amino group, an amidino group, hydrazine, hydrazone, a carboxyl group or a salt thereof, a sulfonic acid group or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, or a $C_6$-$C_{20}$ heteroarylalkyl group.

The term "$C_2$-$C_{20}$ alkenyl group" as used herein refers to vinylene, arylene, or the like. The $C_2$-$C_{20}$ alkenyl group may be unsubstituted, or at least one hydrogen atom of the alkenyl group may be substituted with one of the substituents described above with respect to the alkyl group.

The term "$C_2$-$C_{20}$ alkynyl group" as used herein refers to acetylene, or the like. The $C_2$-$C_{20}$ alkynyl group may be unsubstituted, or at least one hydrogen atom of the alkynyl group may be substituted with one of the substituents described above with respect to the alkyl group.

The term "$C_1$-$C_{20}$ alkylene group" as used herein refers to methylene, ethylene, propylene, isobutylene, sec-butylene, pentylene, iso-amylene, hexylene, or the like. The $C_1$-$C_{20}$ alkylene group may be unsubstituted, or at least one hydrogen atom of the alkylene group may be substituted with one of the substituents described above with respect to the alkyl group.

The term "$C_2$-$C_{20}$ alkenylene group" as used herein refers to an allyl group, or the like. The $C_2$-$C_{20}$ alkenylene group may be unsubstituted, or at least one hydrogen atom of the alkenylene group may be substituted with one of the substituents described above with respect to the alkyl group.

The term "$C_2$-$C_{20}$ alkynylene group" as used herein refers to a diradical acetylene group, or the like. The $C_2$-$C_{20}$ alkynylene group may be unsubstituted, or at least one hydrogen atom of the alkynylene group may be substituted with one of the substituents described above with respect to the alkyl group.

The term "aryl group" as used herein refers to a $C_6$-$C_{20}$ carbocyclic aromatic system containing at least one ring, wherein the rings can be attached to each other pendantly method or fused with each other. The term "aryl" refers to an aromatic radical such as phenyl, naphthyl, tetrahydronaphthyl, or the like. The aryl group may be unsubstituted or may have a substituent such as haloalkylene, nitro, cyano, alkoxy, and lower alkyl amino. In particular, at least one hydrogen atom of the aryl group may be substituted with one of the substituents described above with respect to the alkyl group.

The term "arylene group" as used herein refers to a diradical $C_6$-$C_{20}$ carbocyclic aromatic system containing at least one ring, wherein the rings can be attached to each other pendantly method or fused with each other. The term "arylene" refers to an aromatic diradical, such as phenylene, naphthylene, tetrahydronaphthylene, or the like. The arylene group may have been unsubstituted or may have a substituent such as haloalkylene, nitro, cyano, alkoxy, and lower alkyl amino. In particular, at least one hydrogen atom of the arylene group may be substituted with one of the substituents described above with respect to the alkyl group.

The term "arylalkyl group" as used herein refers to a group in which at least one of the hydrogen atoms in an aryl group as defined above is substituted with a group such as lower alkyl, for example, methyl, ethyl, propyl, or the like. For example, the arylalkyl group may be benzyl, phenylethyl, or the like. At least one hydrogen atom of the arylalkyl group may be substituted with one of the substituents described above with respect to the alkyl group.

The term "heteroaryl group" as used herein refers to a monovalent aromatic organic group that contains 1, 2 or 3 hetero atoms selected from the group consisting of N, O, P, and S and has 1 to 20 carbon atoms. The heteroaryl group may be unsubstituted, or at least one hydrogen atom of the heteroaryl group may be substituted with one of the substituents described above with respect to the alkyl group.

The term "heteroarylene group" as used herein refers to a bivalent aromatic organic group that contains 1, 2 or 3 hetero atoms selected from the group consisting of N, O, P, and S and has 1 to 20 carbon atoms. The heteroarylene group may be unsubstituted or at least one hydrogen atom of the heteroarylene group may be substituted with one of the substituents described above with respect to the alkyl group.

The term "heteroarylalkyl group" as used herein refers to a group in which at least one of the hydrogen atoms of a heteroaryl group as described above is substituted with an alkyl group. At least one hydrogen atom of the heteroarylalkyl group may be substituted with one of the substituents described above with respect to the alkyl group.

The term "carbocyclic group" as used herein refers to a $C_5$-$C_{10}$ non-aromatic cyclic group such as a cyclohexyl group. The carbocyclic group may be unsubstituted, or at least one hydrogen atom of the carbocyclic group may be substituted with one of the substituents described above with respect to the alkyl group.

The term "carbocyclicalkyl group" as used herein refers to a group in which at least one of the hydrogen atoms of the carbocyclic group as described above is substituted with an alkyl group. At least one hydrogen atom of the carbocyclicalkyl group may be substituted with one of the substituents described above with respect to the alkyl group.

The term "heterocyclic group" as used herein refers to a non-aromatic 5-10 membered cyclic group containing a hetero atom such as nitrogen, sulfur, phosphorus, oxygen, and the like. The heterocyclic group may be unsubstituted or at least one hydrogen atom of the heterocyclic group may be substituted with one of the substituents described above with respect to the alkyl group.

The term "heterocyclicalkyl group" as used herein refers to a group in which some of the hydrogen atoms of the heterocyclic group as described above are substituted with an alkyl group. At least one hydrogen atom of the heterocyclicalkyl group may be substituted with one of the substituents described above with respect to the alkyl group.

Hereinafter, aspects of the present invention will be described more specifically with reference to the following examples. The following examples are for illustrative purposes only and are not intended to limit the scope of the invention.

Comparative Preparation Example 1

Preparation of poly[2,2'-(m-phenylene)-5,5'-bibenzimidazole] (PBI)

4.84 g of 3,3'-diaminobenzidine (22.6 mmol) and 3.76 g of an isophthalic acid (22.6 mmol) were dissolved in a mixed solution of 8 g of $P_2O_5$, 30 ml of $CF_3SO_3H$, and 30 ml of $CH_3SO_3H$. The reaction mixture was reacted at 150° C. for 30 minutes under a nitrogen atmosphere. As the reaction proceeded, the reaction mixture became a homogeneous solution, and an increase in viscosity of the reaction mixture was observed. A hot polymer solution was poured into about 1.5 L of water using a peristaltic pump to obtain a polymer in the form of a fine powder. The produced powder was washed with water several times. Then, the residual phosphoric acid in the polymer was removed using a 10% ammonium hydroxide solution and a Soxhlet device. The phosphoric acid removal process was performed until the phosphorous residue in the polymer could not be confirmed as present by elemental analysis. Next, the obtained polymer was dried under pressure at 50° C. for 3 days to obtain about 6 g of polymer (poly[2,2'-(m-phenylene)-5,5'-bibenzimidazole] (PBI)).

The obtained PBI was precipitated using methanol, and the formed precipitate was washed with methanol to obtain PBI.

Synthesis Example 1

Preparation of Benzoxazine-Based Monomer of Formula 6 (BOA)

1 mol of tertiarybutylphenol, 2.2 mol of p-formaldehyde, and 1.1 mol of aniline were mixed together, and the mixture was stirred at 100° C. for 1 hour without a solvent to obtain a crude product.

The crude product was sequentially washed with an aqueous 1N NaOH solution twice and with distilled water once, and then dried using magnesium sulfate. Subsequently, the resultant was filtered and then the solvent was removed therefrom. Then, the resultant was dried under vacuum to obtain the benzoxazine-based monomer of Formula 6 with a yield of 95%.

The structure of the obtained benzoxazine-based monomer of Formula 6 (BOA) was confirmed through an NMR spectrum.

Synthesis Example 2

Preparation of Benzoxazine-Based Monomer (HFA) of Formula 16 where $R_2$ is a Phenyl Group 1 mol of 4,4'-hexafluoroisopropylidene diphenol (4,4'-HFIDPH), 4.4 mol of p-formaldehyde, and 2.2 mol of benzene were mixed together, and the mixture was stirred at 100° C. for 1 hour without a solvent to obtain a crude product.

The crude product was sequentially washed with an aqueous 1N NaOH solution twice and with distilled water once, and then dried using magnesium sulfate. Subsequently, the resultant was filtered and then the solvent was removed therefrom. Then, the resultant was dried under vacuum to obtain the benzoxazine-based monomer of Formula 16 where $R_2$ is a phenyl group with a yield of 96%.

The structure of the obtained benzoxazine-based monomer of Formula 16 (HFA) was confirmed through an NMR spectrum.

Preparation Example 1

Preparation of Polybenzimidazole-Base Complex 50 g of dimethylacetamide was added to 5 g of the PBI powder prepared in Comparative Preparation Example 1 to obtain 10 wt % of a PBI solution.

0.5 g of sodium carbonate was added to the PBI solution, and then the mixture was stirred at 80° C. for 1 hour or more. Subsequently, the resultant was filtered to obtain a polybenzimidazole-base complex.

Figure 2:
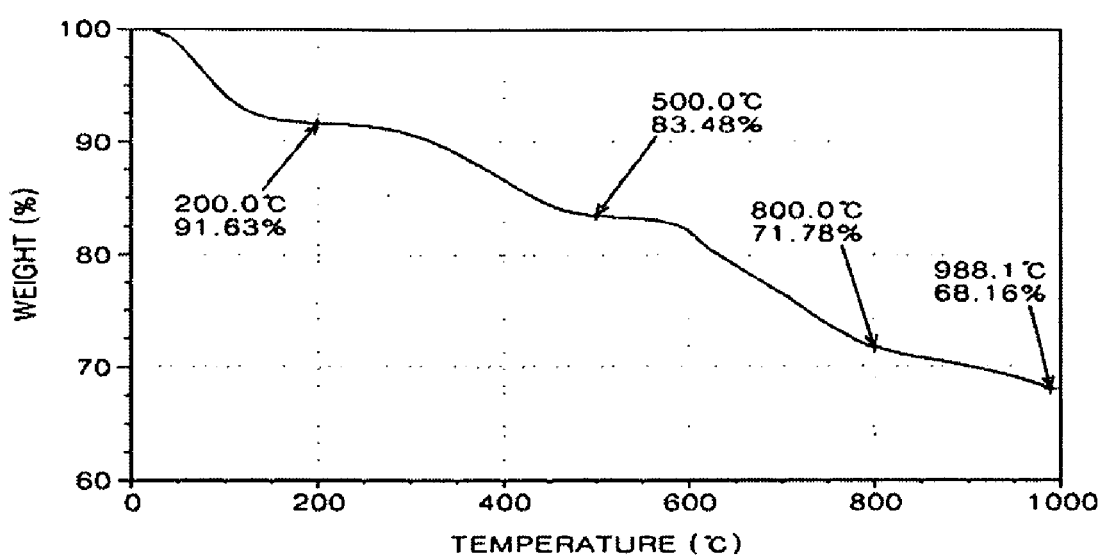
FIG. 2 is a graph showing TGA results of PBI prepared in Preparation Example 1 according to the present invention.
Figure 3:
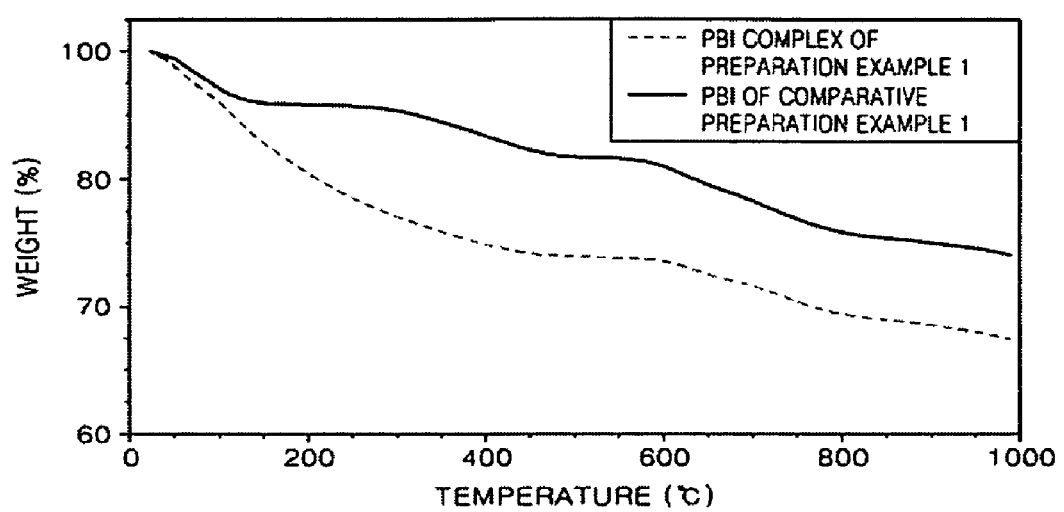
FIG. 3 is a graph showing both the results of FIGS. 1 and 2.

FIGS. 1 through 3 are graphs showing thermogravimetric analysis (TGA) results of the polybenzimidazole-base complex of Preparation Example 1 and PBI of Comparative Preparation Example 1.

In detail, FIG. 1 is a graph showing thermogravimetric analysis (TGA) results of PBI prepared in Comparative Preparation Example 1, FIG. 2 is a graph showing TGA results of PBI prepared in Preparation Example 1 according to the present invention, and FIG. 3 is a combined graph showing the results of both FIGS. 1 and 2.

Referring to FIGS. 1 through 3, the polybenzimidazole-base complex of Preparation Example 1 had a thermal decomposition initiation temperature of 200° C. and was thermally decomposed at a temperature in the range of 200 to 500° C. By contrast, the PBI of Comparative Preparation Example 1 was rapidly thermally decomposed at a temperature in the range of 200 to 500° C. and had a thermal decomposition initiation temperature of 500° C.

Molecular weight properties of the polybenzimidazole-base complex of Preparation Example 1 and PBI of Comparative Preparation Example 1 were analyzed using a gel permeation chromatography (GPC) method. The results are shown in Table 1 below.

TABLE 1

|  | PBI of Comparative Preparation Example 1 | Polybenzimidazole-base complex of Preparation Example 1 |
|---|---|---|
| Number average molecular weight (Mn) | 27,000 | 29,000 |
| Weight average molecular weight (Mw) | 84,000 | 69,000 |
| Viscosity average molecular weight (Mp) | 77,000 | 82,000 |
| Mn/Mw | 3.1 | 2.4 |

Figure 4:
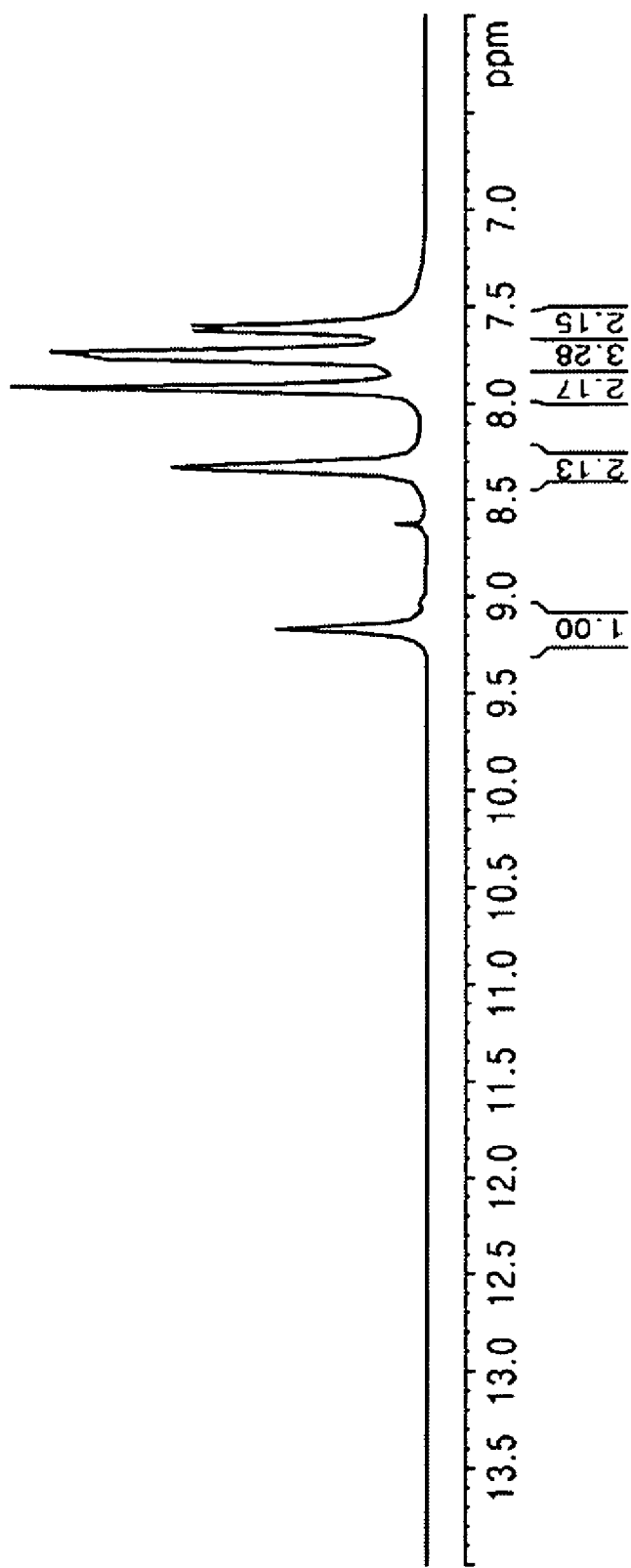
FIG. 4 is a graph showing nuclear magnetic resonance (NMR) analysis data of a polybenzimidazole-base complex prepared in Preparation Example 1.
Figure 5:
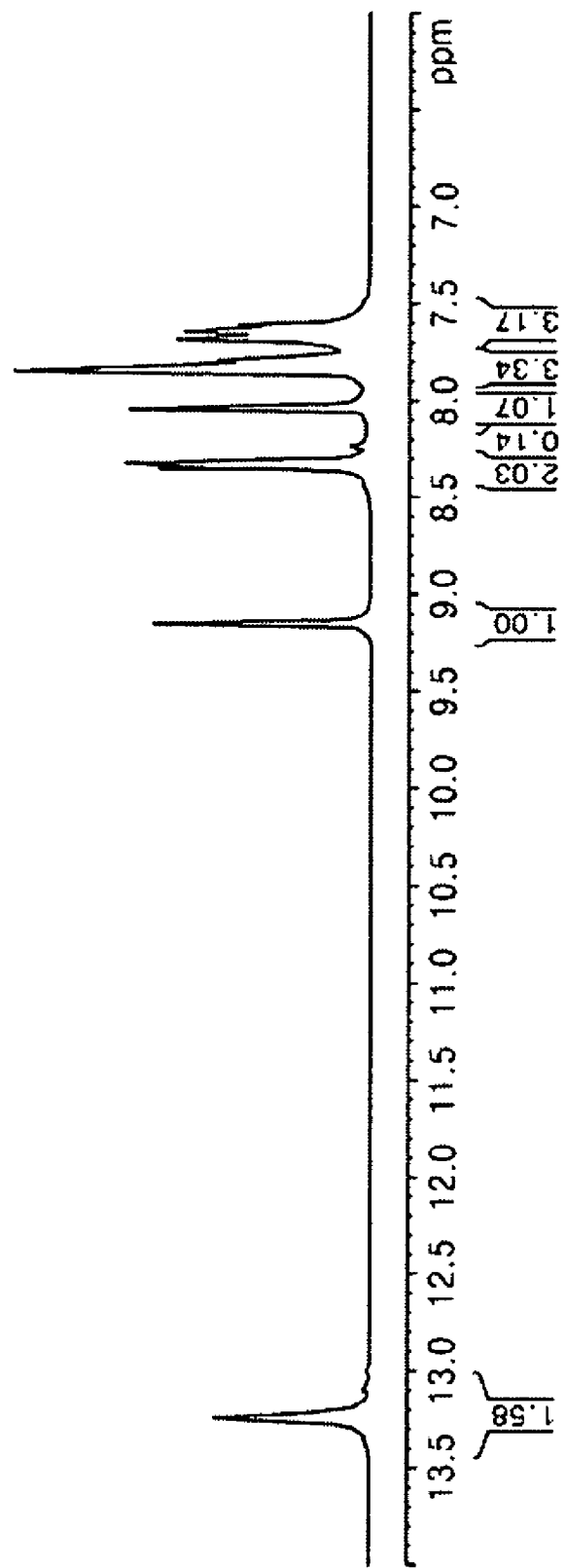
FIG. 5 is a graph showing NMR analysis data of PBI of Comparative Preparation Example 1.

In addition, FIGS. 4 and 5 are graphs showing nuclear magnetic resonance (NMR) analysis data of the polybenzimidazole-base complex of Preparation Example 1 and PBI of Comparative Preparation Example 1, respectively.

Referring to FIGS. 4 and 5, a peak pattern before the formation of the polybenzimidazole-base complex (FIG. 5) is different from a peak pattern after the formation of the polybenzimidazole-base complex (FIG. 4). More particularly, the peak pattern before the formation of the complex is 13.2 (NH, 2H), 9.14 (s, 1H), 8.32 (m, 2H), 8.03 (s, 1H), 7.81 (m, 3H), and the peak pattern after the formation of the complex is 9.14 (s, 1H), 8.32 (d, 2H, J=6.9 Hz), 7.92 (s, 2H), 7.75 (m, 3H), 7.62 (d, 2H, 8.3 Hz). As such, after the formation of the complex, the peak of 13.2 was disappeared. In addition, the structure of the polybenzimidazole-base complex could be confirmed from FIG. 4.

In addition, an inductively coupled plasma (ICP) analysis of the polybenzimidazole-base complex of Preparation Example 1 was conducted. For ICP analysis data comparison, an ICP analysis of a sample obtained by impregnating PBI of Comparative Preparation Example 1 with a phosphoric acid was also conducted.

As shown in the ICP analysis results, the polybenzimidazole-base complex of Preparation Example 1 had an amount of sodium of about 1,170 ppm. A metal sodium was not detected in the sample obtained by impregnating PBI of Comparative Preparation Example 1 with a phosphoric acid.

Preparation Example 2

Synthesis of Crosslinked Material 6 parts by weight of BOA of Synthesis Example 1, 0.3 parts by weight of HFA of Synthesis Example 2, and 3.7 parts by weight of the polybenzimidazole-base complex of Preparation Example 1 (Mw: 69,000 Mn: 29,000) were blended, and then the mixture was heated up to 220° C. at a heating rate of 20° C./Hr and cured at 220° C. to obtain a crosslinked material.

Example 1

Manufacture of Fuel Cell

The polybenzimidazole-base complex of Preparation Example 1 was impregnated with phosphoric acid at 80° C. for 2.5 hours to form an electrolyte membrane. The impregnation amount of the phosphoric acid was about 375 parts by weight with respect to 100 parts by weight of the total weight of the electrolyte membrane.

1 g of a catalyst in which 50 wt % of PtCo was supported on carbon and 3 g of NMP as a solvent were added to a stirrer. The mixture was stirred using a mortar to prepare a slurry.

Subsequently, an NMP solution of 5 wt % of polyvinylidenefluoride was added to the resultant so that the resultant contained 0.025 g of polyvinylidenefluoride. The resultant was mixed for 10 minutes to prepare a slurry used to form a cathode catalyst layer.

Carbon paper was cut to a size of 4×7 cm$^2$, fixed on a glass plate, and coated by a doctor blade (Sheen instrument). The gap interval of the doctor blade was adjusted to 600 μm.

The slurry to form the cathode catalyst layer was coated onto the carbon paper, and the resultant was dried at room temperature for 1 hour, dried at 80° C. for 1 hour, dried at 120° C. for 30 minutes, and dried at 150° C. for 15 minutes to prepare a cathode (a fuel electrode). The loading amount of PtCo in the prepared cathode was in the range of 2.2 to 2.4 mg/cm$^2$.

An electrode prepared using the following processes was used as an anode. 2 g of a catalyst in which 50 wt % of Pt was supported on carbon and 9 g of NMP as a solvent were added to a stirrer, and the mixture was stirred for 2 minutes using a high speed stirrer. Subsequently, a solution in which 0.05 g of polyvinylidenefluoride was dissolved in 1 g of NMP was added to the mixture, and the resultant was further stirred for 2 minutes to prepare a slurry used to form an anode catalyst layer. The slurry used to form an anode catalyst layer was coated onto carbon paper coated with a microporous layer using a bar coater. As a result, preparation of the anode was completed. The loading amount of Pt in the prepared anode was in the range of 1.1 to 1.34 mg/cm$^2$.

The electrolyte membrane was disposed between the cathode and the anode to prepare a MEA. The cathode and anode were not impregnated with phosphoric acid.

To prevent gas permeation between the cathode and the anode, a TEFLON membrane for a main gasket with a thickness of 200 μm and a TEFLON membrane for a subgasket with a thickness of 20 μm were joined and disposed between the electrode and the electrolyte membrane. Thus, the manufacture of a fuel cell was completed.

Electricity was generated by causing hydrogen to flow into the anode (flowrate: 100 ccm) and causing air to flow into the cathode (flowrate: 250 ccm) at 150° C. under a condition where the electrolyte membrane was not humidified, and characteristics of the fuel cell were measured. An electrolyte doped with a phosphoric acid was used, and thus the performance of the fuel cell improved as time elapsed. Thus, aging was performed until an operating voltage reached a peak, and then the characteristics of the fuel cell were finally evaluated.

Example 2

Manufacture of Fuel Cell

The crosslinked material of Preparation Example 2 was impregnated with 85 wt % of phosphoric acid at 80° C. for 2.5 hours to form an electrolyte membrane. The impregnation amount of the phosphoric acid was about 500 parts by weight with respect to 100 parts by weight of the total weight of the electrolyte membrane.

A PBI electrode was manufactured by using PBI and polyvinylidene fluoride (PVDF) as binders to prepare a slurry for a catalyst layer and coating the slurry onto carbon paper coated with a microporous layer by using a bar coater. The loading amount of Pt in the prepared PBI electrode was in the range of 1.0 to 1.4 mg/cm$^2$. When Pt—Co alloy, which is known to prevent phosphoric acid anions from being absorbed, resulting in improvement in catalyst activity, was used as a catalyst, only polyvinylidenefluoride was used as the binder to prepare a catalyst ink, and then the catalyst ink was coated on carbon paper coated with a microporous layer by using a bar coater to manufacture an electrode. The loading amount of Pt in the prepared electrode was in the range of 2.2 to 2.4 mg/cm$^2$. The crosslinked material of Preparation Example 2 impregnated with a phosphoric acid was introduced between the electrodes to manufacture a membrane-electrode assembly (MEA) and thus the manufacture of a fuel cell using the MEA was completed.

Comparative Example 1

A fuel cell was manufactured in the same manner as in Example 1, except that PBI of Comparative Preparation Example 1 was used instead of the polybenzimidazole-base complex of Preparation Example 1 in the preparation of the electrolyte membrane, and the impregnation amount of the phosphoric acid was about 309 parts by weight with respect to 100 parts by weight of the total weight of the electrolyte membrane. Performance of the fuel cell was then evaluated.

Figure 6:
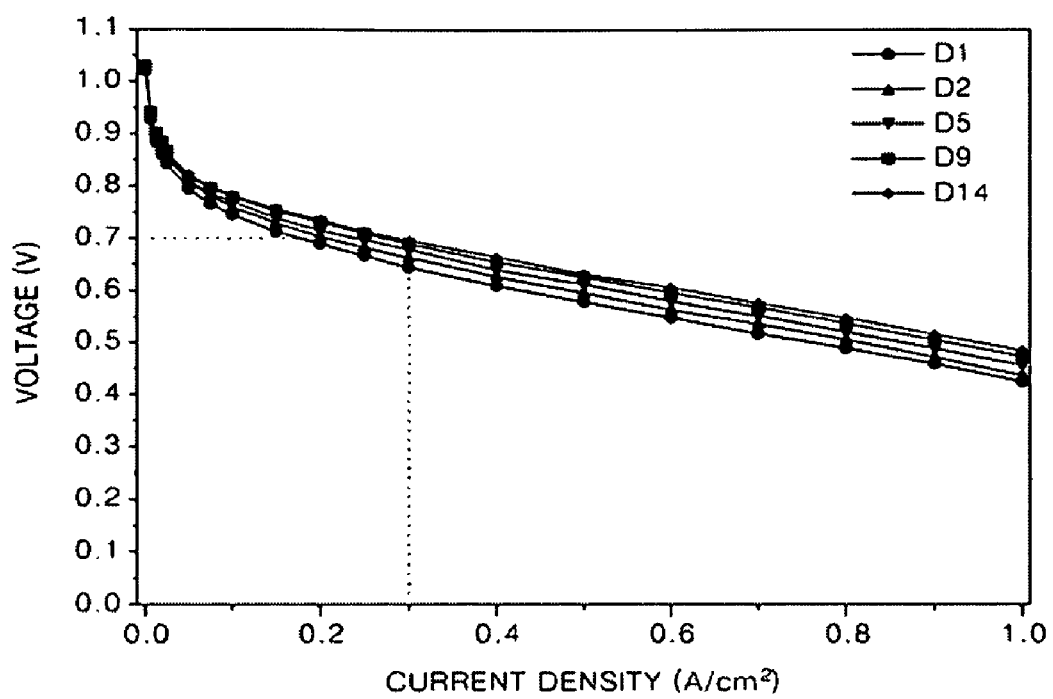
FIGS. 6 and 7 are graphs showing voltage with respect to current density of fuel cells manufactured in Example 1 and Comparative Example 1, respectively.
Figure 7:
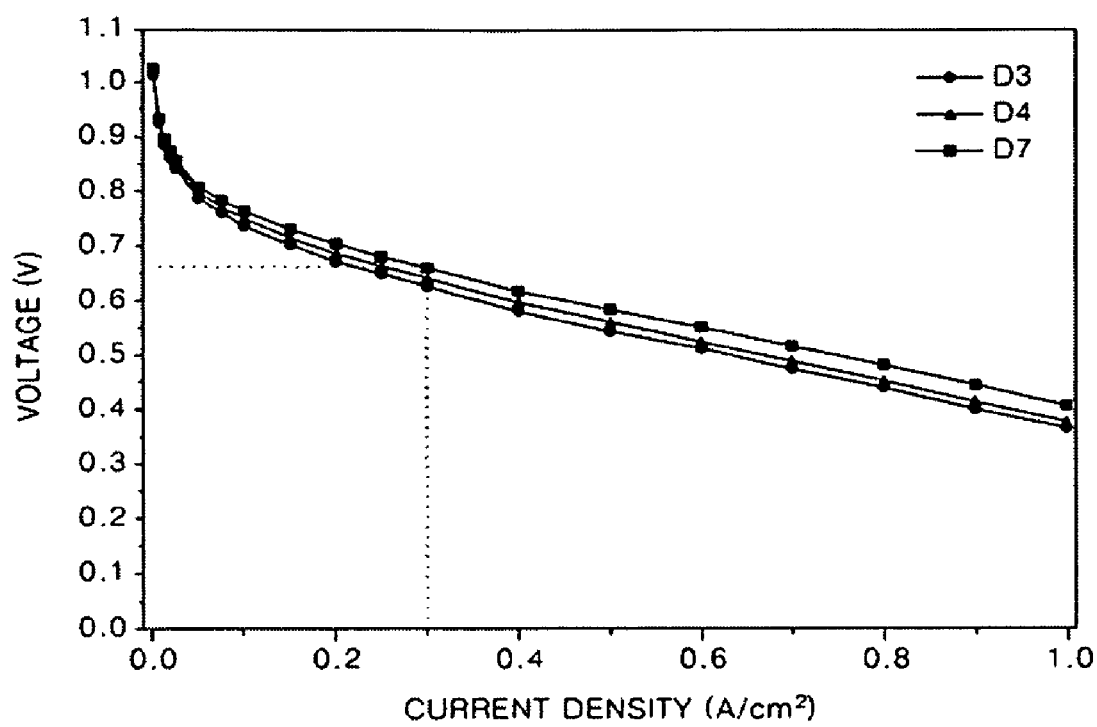

FIGS. 6 and 7 respectively show performance evaluation results of the fuel cells manufactured in Example 1 and Comparative Example 1. Referring to FIGS. 6 and 7, the fuel cell of Example 1 (FIG. 6) had improved voltage characteristics with respect to current density, compared with the fuel cell of Comparative Example 1 (FIG. 7). In FIG. 6, the reference legends "D1," "D2," "D5," "D9," and "D14" respectively indicate the first, second, fifth, ninth and fourteen day of operation of the fuel cell of Example 1; In FIG. 7, the reference legends "D3," "D4," and "D7" respectively indicate the first, second, fifth, ninth and fourteen day of operation of the fuel cell of Example 1

Figure 8:
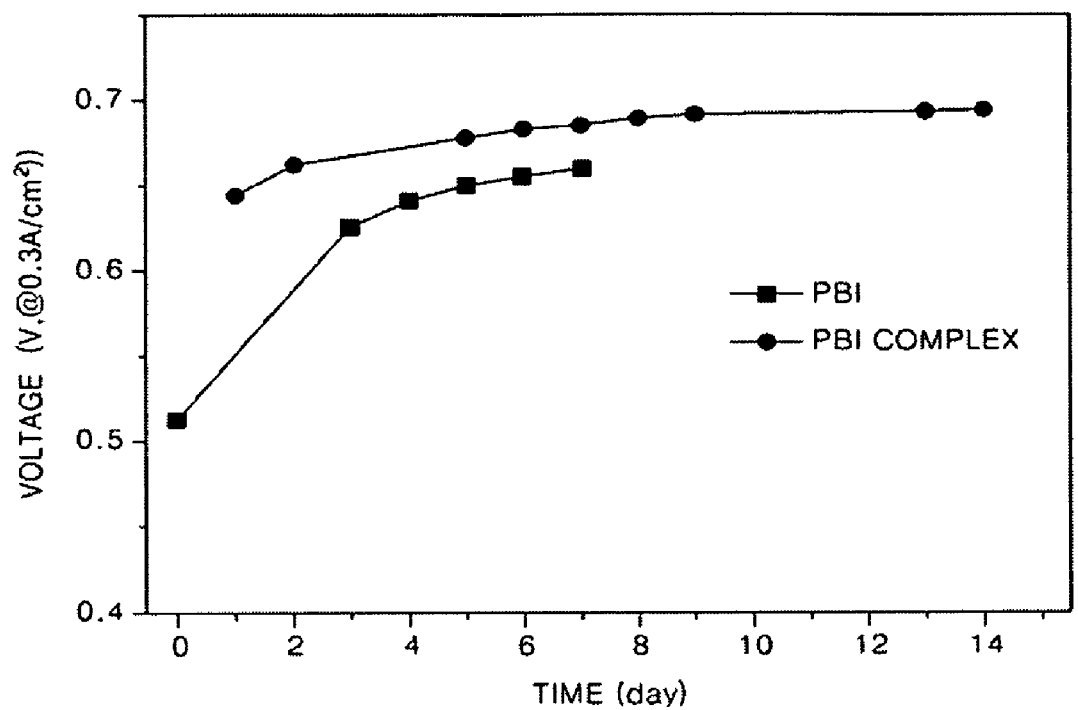
FIG. 8 is a graph showing aging speed of fuel cells of Example 1 and Comparative Example 1.

In addition, FIG. 8 is a graph showing aging speed of fuel cells of Example 1 and Comparative Example 1. Referring to FIG. 8, the fuel cell of Example 1 using the polybenzimidazole-base complex had a maximum performance of about 22 mV greater than that of the fuel cell of Comparative Example 1.

Figure 9:
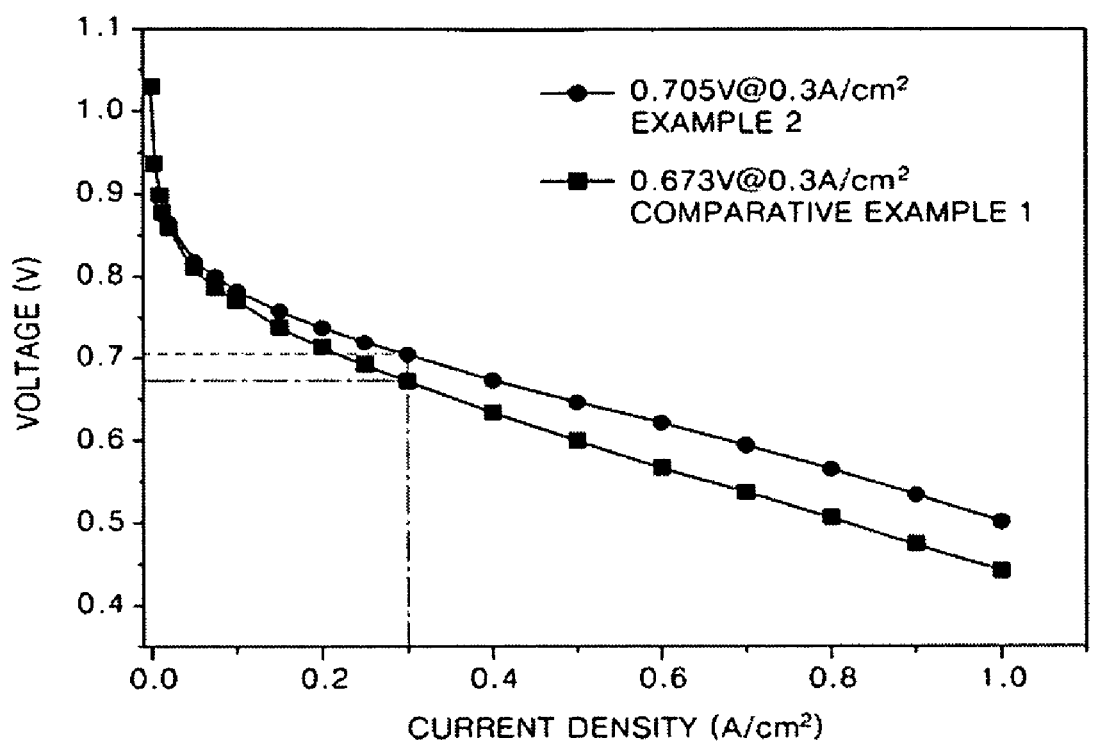
FIG. 9 is a graph showing a change in cell potential with respect to current density of fuel cells of Example 2 and Comparative Example 1.

FIG. 9 is a graph showing a change in cell potential with respect to current density of the fuel cells of Example 2 and Comparative Example 1. Referring to FIG. 9, the evaluations were performed based on a loading amount of a catalyst in the same electrode and an activation time of 7 days.

As shown in the evaluation results, the fuel cell of Example 2 had improved cell potential characteristics compared with the fuel cell of Comparative Example 1.

While aspects of the present invention has been particularly shown and described with reference to exemplary embodiments thereof, it will be understood by those of ordinary skill in the art that various changes in form and details may be made therein without departing from the spirit and scope of the present invention as defined by the following claims.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A polybenzimidazole-base complex comprising a polybenzimidazole-based material and a base, wherein in a $^1$H nuclear magnetic resonance ($^1$H-NMR) spectrum of the polybenzimidazole-base complex, a peak corresponding to NH of an imidazole ring of the polybenzimidazole-based material does not appear at a chemical shift of 12 to 15 ppm.

2. The polybenzimidazole-base complex of claim 1, wherein peaks of the $^1$H nuclear magnetic resonance ($^1$H-NMR) spectrum of the polybenzimidazole-base complex are detected at chemical shifts of 9.14±0.5, 8.32±0.5, 7.92±0.5, 7.75±0.5, and 7.62±0.5 by $^1$H-NMR operating at 300 MHz.

3. The polybenzimidazole-base complex of claim 1, wherein the amount of the base in the polybenzimidazole-base complex is in the range of 0.01 to 20 parts by weight based on 100 parts by weight of the polybenzimidazole-based material.

4. The polybenzimidazole-base complex of claim 1, wherein the base is at least one selected from the group consisting of sodium carbonate ($Na_2CO_3$), sodium hydrogen carbonate ($NaHCO_3$), potassium carbonate ($K_2CO_3$), potassium hydrogen carbonate ($KHCO_3$), lithium carbonate ($Li_2CO_3$), rubidium carbonate ($Rb_2CO_3$), cesium carbonate ($Cs_2CO_3$), ammonium carbonate (($NH_4)_2CO_3$), and ammonium hydrogen carbonate (($NH_4)HCO_3$).

5. The polybenzimidazole-base complex of claim 4, wherein an amount of metal ions measured by inductively coupled plasma (ICP) analysis of the polybenzimidazole-base complex is in the range of 300 to 1200 ppm.

6. The polybenzimidazole-base complex of claim 1, wherein a thermal decomposition initiation temperature of the polybenzimidazole-base complex is in the range of 180 to 220° C.

7. The polybenzimidazole-base complex of claim 1, wherein a ratio of a weight average molecular weight to a number average molecular weight (Mw/Mn) of the polybenzimidazole-base complex is in the range of 2.1:1 to 2.5:1.

8. The polybenzimidazole-base complex of claim 1, having a weight average molecular weight of 65,000 to 70,000, and a number average molecular weight of 25,000 to 30,000.

9. The polybenzimidazole-base complex of claim 1, wherein the polybenzimidazole-based material is poly[2,2'-(m-phenylene)-5,5'-bibenzimidazole] (PBI) or poly(2,5-benzimidazole) (ABPBI).

10. The polybenzimidazole-base complex of claim 1 formed by dissolving a polybenzimidazole-based material in an organic solvent to obtain a polybenzimidazole solution, adding a base to the polybenzimidazole solution and mixing the mixture, and then heat treating the resultant.

11. A method of preparing the polybenzimidazole-base complex according to claim 1, comprising:
dissolving a polybenzimidazole-based material in an organic solvent to obtain a polybenzimidazole solution; and
adding a base to the polybenzimidazole solution and mixing the mixture, and then heat treating the resultant.

12. The method of claim 11, wherein the base is at least one selected from the group consisting of sodium carbonate ($Na_2CO_3$), sodium hydrogen carbonate ($NaHCO_3$), potassium carbonate ($K_2CO_3$), potassium hydrogen carbonate ($KHCO_3$), lithium carbonate ($Li_2CO_3$), rubidium carbonate ($Rb_2CO_3$), and cesium carbonate ($Cs_2CO_3$).

13. The method of claim 11, wherein the organic solvent is at least one selected from the group consisting of dimethylacetamide, dimethylformamide, dimethylsulfoxide, and N-methylpyrrolidone.

14. The method of claim 11, wherein the heat treatment is performed at a temperature in the range of 60 to 150° C.

15. An electrolyte membrane for a fuel cell, comprising the polybenzimidazole-base complex according to claim 1.

16. The electrolyte membrane of claim 15, further comprising at least one proton conductor selected from a phosphoric acid, a phosphonic acid, and a $C_1$-$C_{20}$ organic phosphonic acid.

17. A fuel cell comprising a cathode; an anode; and an electrolyte membrane disposed therebetween,
wherein the electrolyte membrane comprises the polybenzimidazole-base complex according to claim 1.

18. A crosslinked material comprising a polymerized product of (i) the polybenzimidazole-base complex according to claim 1, and (ii) at least one selected from a first benzoxazine-based monomer represented by Formula 3 below and a second benzoxazine-based monomer represented by Formula 4 below:

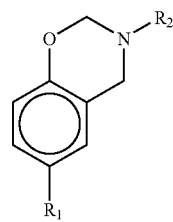

<Formula 3> wherein $R_1$ is hydrogen, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_2$-$C_{20}$ heteroaryl group, a substituted or unsubstituted $C_4$-$C_{20}$ cycloalkyl group, a substituted or unsubstituted $C_2$-$C_{20}$ heterocyclic group, a halogen atom, a hydroxyl group, or a cyano group, $R_2$ is a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group, <Formula 4>

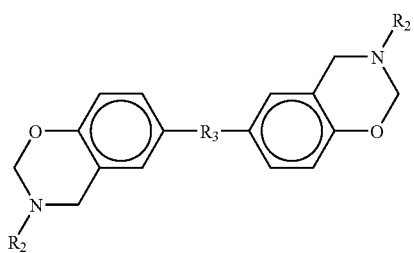

wherein $R_2$ is as defined above, and $R_3$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—.

19. The crosslinked material of claim 18, wherein the amount of the polybenzimidazole-base complex is in the range of 5 to 95 parts by weight based on 100 parts by weight of the total weight of the at least one selected from the first benzoxazine-based monomer and the second benzoxazine-based monomer.

20. The crosslinked material of claim 18, wherein the first benzoxazine-based monomer is a compound represented by one of Formulae 5 through 14 below:

<Formula 5>

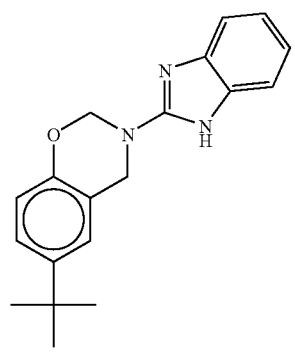

<Formula 6>

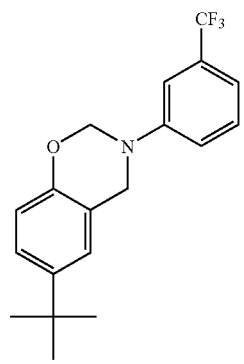

<Formula 7>

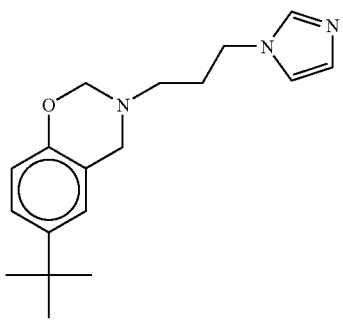

<Formula 8>

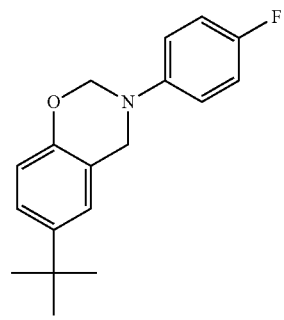

<Formula 9>

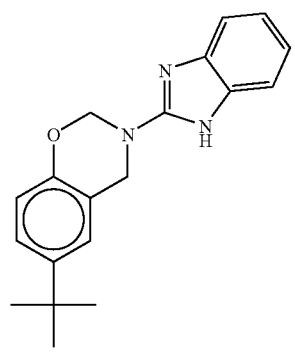

<Formula 10>

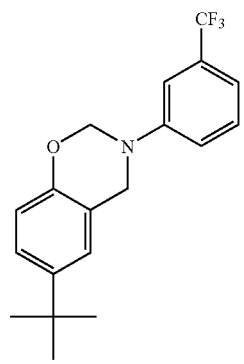

-continued
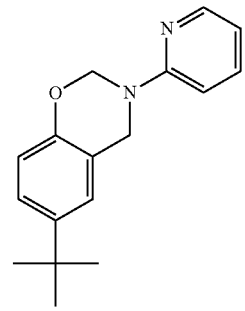
<Formula 11>
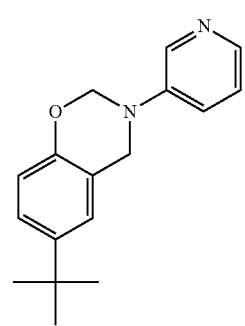
<Formula 12>
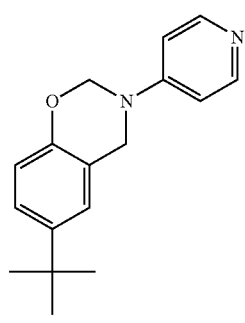
<Formula 13>
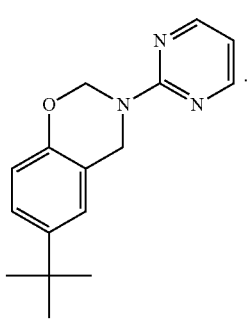
<Formula 14>
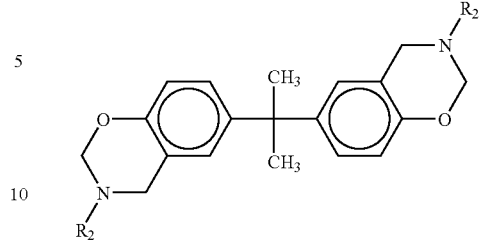
<Formula 15>
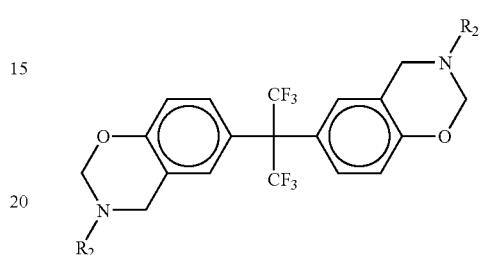
<Formula 16>
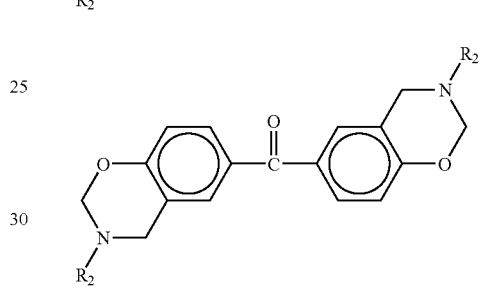
<Formula 17>
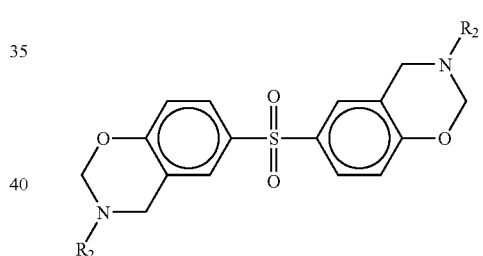
<Formula 18>
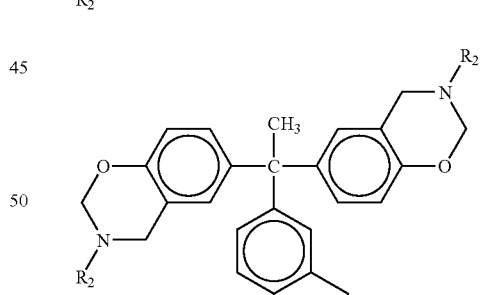
<Formula 19>
wherein $R_2$ is a phenyl group, —$CH_2$—CH=$CH_2$, or a group represented by one of the following formulae,
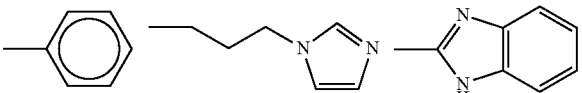
21. The crosslinked material of claim 18, wherein the second benzoxazine-based monomer a compound represented by one of Formulae 15 through 19 below;

-continued

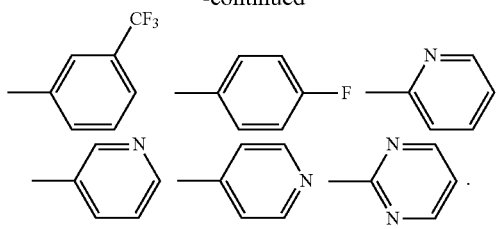

22. The crosslinked material of claim 18, being a three-component polymerized resultant of a first benzoxazine-based monomer represented by Formula 6 below; a second benzoxazine-based monomer represented by Formula 16 below; and the polybenzimidazole-base complex;

<Formula 6>

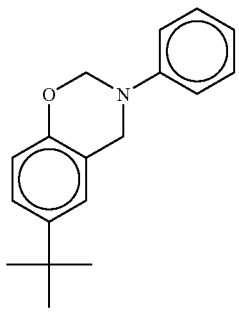

<Formula 16>

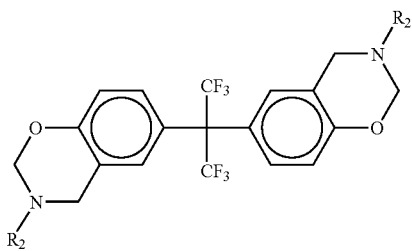

wherein $R_2$ is a phenyl group.

23. The crosslinked material of claim 18, which is a polymerized product of the polybenzimidazole-base complex, at least one first benzoxazine-based monomer represented by Formula 3 and at least one second benzoxazine-based monomer represented by Formula 4.

24. The crosslinked material of claim 23, wherein, the amount of the at least one second benzoxazine-based monomer is in the range of 0.5 to 50 parts by weight based on 100 parts by weight of the at least one first benzoxazine-based monomer.

25. An electrolyte membrane comprising the crosslinked material of claim 18.

26. The electrolyte membrane of claim 24, further comprising at least one proton conductor selected from a phosphoric acid, a phosphonic acid, and a $C_1$-$C_{20}$ organic phosphonic acid.

27. A fuel cell comprising the electrolyte membrane comprising the crosslinked material of claim 18.

28. An electrolyte membrane for a fuel cell, comprising the polybenzimidazole-base complex according to claim 2.

29. An electrolyte membrane for a fuel cell, comprising the polybenzimidazole-base complex according to claim 3.

30. An electrolyte membrane for a fuel cell, comprising the polybenzimidazole-base complex according to claim 4.

31. An electrolyte membrane for a fuel cell, comprising the polybenzimidazole-base complex according to claim 5.

32. An electrolyte membrane for a fuel cell, comprising the polybenzimidazole-base complex according to claim 6.

33. An electrolyte membrane for a fuel cell, comprising the polybenzimidazole-base complex according to claim 7.

34. An electrolyte membrane for a fuel cell, comprising the polybenzimidazole-base complex according to claim 8.

35. An electrolyte membrane for a fuel cell, comprising the polybenzimidazole-base complex according to claim 9.

36. A fuel cell comprising a cathode; an anode; and an electrolyte membrane disposed therebetween,
wherein the electrolyte membrane comprises the polybenzimidazole-base complex according to claim 2.

37. A fuel cell comprising a cathode; an anode; and an electrolyte membrane disposed therebetween,
wherein the electrolyte membrane comprises the polybenzimidazole-base complex according to claim 3.

38. A fuel cell comprising a cathode; an anode; and an electrolyte membrane disposed therebetween,
wherein the electrolyte membrane comprises the polybenzimidazole-base complex according to claim 4.

39. A fuel cell comprising a cathode; an anode; and an electrolyte membrane disposed therebetween,
wherein the electrolyte membrane comprises the polybenzimidazole-base complex according to claim 5.

40. A fuel cell comprising a cathode; an anode; and an electrolyte membrane disposed therebetween,
wherein the electrolyte membrane comprises the polybenzimidazole-base complex according to claim 6.

41. A fuel cell comprising a cathode; an anode; and an electrolyte membrane disposed therebetween,
wherein the electrolyte membrane comprises the polybenzimidazole-base complex according to claim 7.

42. A fuel cell comprising a cathode; an anode; and an electrolyte membrane disposed therebetween,
wherein the electrolyte membrane comprises the polybenzimidazole-base complex according to claim 8.

43. A fuel cell comprising a cathode; an anode; and an electrolyte membrane disposed therebetween,
wherein the electrolyte membrane comprises the polybenzimidazole-base complex according to claim 9.

* * * * *